(12) United States Patent
Su

(10) Patent No.: US 10,031,524 B2
(45) Date of Patent: Jul. 24, 2018

(54) METHOD AND DEVICE FOR CONTROLLING GAIT OF BIPED ROBOT

(71) Applicant: Goertek Inc., Weifang, ShanDong Province (CN)

(72) Inventor: Pengcheng Su, Weifang (CN)

(73) Assignee: GOERTEK INC., Weifang, Shandong Province (CN)

(*) Notice: Subject to any disclaimer, the term of this patent is extended or adjusted under 35 U.S.C. 154(b) by 0 days.

(21) Appl. No.: 15/537,117

(22) PCT Filed: Sep. 5, 2016

(86) PCT No.: PCT/CN2016/098084
§ 371 (c)(1),
(2) Date: Jun. 16, 2017

(87) PCT Pub. No.: WO2017/092463
PCT Pub. Date: Jun. 8, 2017

(65) Prior Publication Data
US 2018/0004208 A1 Jan. 4, 2018

(30) Foreign Application Priority Data
Dec. 2, 2015 (CN) .......................... 2015 1 0874545

(51) Int. Cl.
*G05D 1/02* (2006.01)
*B62D 57/032* (2006.01)

(52) U.S. Cl.
CPC ........... *G05D 1/021* (2013.01); *B62D 57/032* (2013.01)

(58) Field of Classification Search
CPC ....... G05D 1/021; B62D 57/032; B25J 9/161; B25J 9/0006; B25J 9/00; G06N 3/008;
(Continued)

(56) References Cited

U.S. PATENT DOCUMENTS 6,301,524 B1 * 10/2001 Takenaka ............... B62D 57/02
318/568.12
6,802,382 B2 * 10/2004 Hattori .................. B62D 57/032
180/8.6
(Continued)

FOREIGN PATENT DOCUMENTS

CN 101950176 A 1/2011
CN 103149933 A 6/2013
(Continued)

OTHER PUBLICATIONS

International Search Report (PCT/ISA/210) dated Nov. 30, 2016, by the State Intellectual Property Office of the P.R. China as the International Searching Authority for International Application No. PCT/CN2016/098084.
(Continued)

*Primary Examiner* — Jaime Figueroa
(74) *Attorney, Agent, or Firm* — Buchanan Ingersoll & Rooney PC

(57) ABSTRACT

A method and a device for controlling a gait of a biped robot. The method includes: selecting gait controlling parameters, and acquiring a movement trajectory of a center of mass when a zero moment point of the biped robot is located within a steady area; obtaining first numerical values of each of the gait controlling parameters of the center of mass and second numerical values of the center of mass; setting a first constraint condition when the step starting phase ends by using the first numerical values, and setting a second constraint condition when the step ending phase starts by using the second numerical values; calculating the movement trajectories of the center of mass in the step starting phase and the step ending phase on the basis of the first constraint condition and the second constraint condition, respectively; and controlling a walking of the biped robot.

21 Claims, 4 Drawing Sheets

(58) Field of Classification Search
CPC ........... G05B 2219/40304; G05B 2219/39273; G05B 2219/40264; Y10S 901/48; Y10S 901/01
USPC .................................................. 700/245, 253
See application file for complete search history.

(56) References Cited

U.S. PATENT DOCUMENTS

| | | | | |
|---|---|---|---|---|
| 6,832,132 | B2* | 12/2004 | Ishida | B62D 57/032 180/8.1 |
| 7,949,428 | B2* | 5/2011 | Endo | B25J 9/161 318/567 |
| 7,957,835 | B2* | 6/2011 | Suga | B62D 57/032 318/568.12 |
| 8,126,594 | B2* | 2/2012 | Hong | B62D 57/032 318/568 |
| 8,140,189 | B2* | 3/2012 | Nagasaka | B25J 9/1671 318/568.11 |
| 8,498,743 | B2* | 7/2013 | Kwak | B62D 57/032 318/568.11 |
| 8,554,366 | B2* | 10/2013 | Kajima | B62D 57/032 318/568.12 |
| 8,855,821 | B2* | 10/2014 | Seo | B25J 9/0006 700/250 |
| 9,434,430 | B2* | 9/2016 | Moridaira | B62D 57/032 |
| 2003/0125839 | A1* | 7/2003 | Takenaka | B62D 57/02 700/245 |
| 2005/0075755 | A1* | 4/2005 | Takenaka | B62D 57/032 700/245 |
| 2005/0209536 | A1* | 9/2005 | Dariush | A61B 5/1038 600/595 |
| 2005/0240307 | A1* | 10/2005 | Kuroki | B25J 13/085 700/245 |
| 2005/0267630 | A1 | 12/2005 | Kajita et al. | |
| 2007/0050047 | A1* | 3/2007 | Ragnarsdottlr | A61F 2/68 623/24 |
| 2009/0271037 | A1 | 10/2009 | Hong et al. | |
| 2012/0197435 | A1* | 8/2012 | Maisonnier | B62D 57/032 700/245 |
| 2013/0184861 | A1* | 7/2013 | Pratt | G05D 1/021 700/245 |
| 2016/0243699 | A1* | 8/2016 | Kim | B25J 9/1605 |
| 2016/0288848 | A1* | 10/2016 | Hurst | B62D 57/032 |
| 2016/0331557 | A1* | 11/2016 | Tong | A61F 2/6607 |

FOREIGN PATENT DOCUMENTS

| | | |
|---|---|---|
| CN | 103770111 A | 5/2014 |
| CN | 105511465 A | 4/2016 |
| JP | 2004-114243 A | 4/2004 |
| JP | 2012-040644 A | 3/2012 |

OTHER PUBLICATIONS

Written Opinion (PCT/ISA/237) dated Nov. 30, 2016, by the State Intellectual Property Office of the P.R. China as the International Searching Authority for International Application No. PCT/CN2016/098084.

Chinese Office Action dated Feb. 21, 2017, issued by the State Intellectual Property Office of People's Republic of China in corresponding Chinese Patent Application No. 201510874545.X. (5 pages).

* cited by examiner

METHOD AND DEVICE FOR CONTROLLING GAIT OF BIPED ROBOT

TECHNICAL FIELD

The present disclosure relates to the technical field of robot, and particularly to a method and a device for controlling a gait of a biped robot.

BACKGROUND ART

Biped robots are robot systems that simulate the structure and mode of movement of human legs. It has the movement characteristic of human legs, and has complex interaction with the ground during the walking process. Biped robots need high degree of stability controlling when walking. Therefore, reasonable gait controlling is the precondition for realizing the human-simulating steady dynamic walking of biped robots. One complete gait of biped robots comprises a step starting phase, a mid-step phase and a step ending phase. The step starting phase and the step ending phase are very critical parts of gait controlling, and influence whether the robot can successfully enter the walking state and end the walking state. However, currently the research on biped robots mainly focuses on the controlling on the gait in the mid-step phase, and the research on the controlling on the gait in the step starting phase and the step ending phase is little. In addition, in the prior art, the step starting phase and the step ending phase have poor walking stability, and cannot steadily enter the walking state and steadily end the walking state.

SUMMARY OF THE DISCLOSURE

The present disclosure provides a method and a device for controlling a gait of a biped robot, to solve the problem in the conventional solutions for controlling a gait of a biped robot that the step starting phase and the step ending phase have poor walking stability and cannot steadily enter the walking state and steadily end the walking state.

According to an aspect of the present disclosure, there is provided a method for controlling a gait of a biped robot, comprising:

selecting gait controlling parameters of the biped robot in a step starting phase, a mid-step phase and a step ending phase, and acquiring a movement trajectory of a center of mass of the biped robot in the mid-step phase when a zero moment point of the biped robot is located within a steady area;

obtaining, according to the movement trajectory of the center of mass in the mid-step phase, first numerical values of each of the gait controlling parameters of the center of mass when the mid-step phase starts and second numerical values of each of the gait controlling parameters of the center of mass when the mid-step phase ends;

setting a first constraint condition that the center of mass is required to satisfy when the step starting phase ends by using the first numerical values, and setting a second constraint condition that the center of mass is required to satisfy when the step ending phase starts by using the second numerical values;

calculating the movement trajectories of the center of mass in the step starting phase and the step ending phase on the basis of the first constraint condition and the second constraint condition, respectively; and controlling a walking of the biped robot, so that when the biped robot is walking, the movement trajectory of the center of mass satisfies each of the movement trajectories of the center of mass in the step starting phase, the mid-step phase and the step ending phase, to realize a steady walking of the biped robot.

According to another aspect of the present disclosure, there is provided a device for controlling a gait of a biped robot, the device comprising:

a center of mass mid-step phase trajectory acquiring unit, for selecting gait controlling parameters of the biped robot in a step starting phase, a mid-step phase and a step ending phase, and acquiring a movement trajectory of a center of mass of the biped robot in the mid-step phase when a zero moment point of the biped robot is located within a steady area;

a parameter value acquiring unit, for obtaining, according to the movement trajectory of the center of mass in the mid-step phase, first numerical values of each of the gait controlling parameters of the center of mass when the mid-step phase starts and second numerical values of each of the gait controlling parameters of the center of mass when the mid-step phase ends;

a constraint condition setting unit, for setting a first constraint condition that the center of mass is required to satisfy when the step starting phase ends by using the first numerical values, and setting a second constraint condition that the center of mass is required to satisfy when the step ending phase starts by using the second numerical values;

a center of mass step starting and step ending phase trajectory calculating unit, for calculating the movement trajectories of the center of mass in the step starting phase and the step ending phase on the basis of the first constraint condition and the second constraint condition, respectively; and a center of mass trajectory controlling unit, for controlling a walking of the biped robot, so that when the biped robot is walking, the movement trajectory of the center of mass satisfies each of the movement trajectories of the center of mass in the step starting phase, the mid-step phase and the step ending phase, to realize a steady walking of the biped robot.

The advantageous effects of the present disclosure are: the solution of controlling a gait of a biped robot of the embodiments of the present disclosure firstly selects gait controlling parameters of the biped robot, acquires a movement trajectory of a center of mass in the mid-step phase when a zero moment point ZMP of the biped robot is located within a steady area and first numerical values and second numerical values that are corresponding to each of the gait controlling parameters, determines the movement trajectory of the center of mass in the step starting phase according to the first numerical values, and calculates the movement trajectory of the center of mass in the step ending phase by using the second numerical values, thereby realizing keeping the continuous linking of the step starting phase and the step ending phase with the mid-step phase by the gait controlling parameters. In addition, because the steady walking of the robot is ensured by the conditional defining of the mid-step phase by using the ZMP, then by appropriately linking the step starting phase, the mid-step phase and the step ending phase using the gait controlling parameters, each of the phases satisfies the steady walking condition, which ensures the steady walking of the biped robot in the whole movement. Furthermore, the technical solutions, on the basis of ensuring that the center of mass of the robot satisfies steady walking, provide on the basis of the movement trajectory of the center of mass a new solution of controlling the walking gaits of each of the joints of the legs, and such a controlling solution can further improve the stability of the walking process, increase the efficiency of the whole walking process, and realize the steady starting and ending of the walking process.

DETAILED DESCRIPTION

The technical solutions of the embodiments of the present disclosure propose solutions of controlling the complete gait of the steady walking of a biped robot, which can more effectively realize steady step starting and steady step ending. In addition, the technical solutions, by obtaining the movement trajectory in the mid-step phase on the precondition that the zero moment point is always located in the steady area, reasonably link the movement trajectories of the step starting phase, the step ending phase and the mid-step phase in terms of position, speed and/or acceleration, to ensure that the step starting phase and the step ending phase can both satisfy the stability condition. In addition, the solutions, by using the conversion between potential energy and kinetic energy when the robot is moving, can start and end the normal walking process rapidly in one step, which avoids the problem in the prior art that several phases are required to reach and end the normal walking state, and realizes the steady and fast walking of the biped robot.

Figure 1:
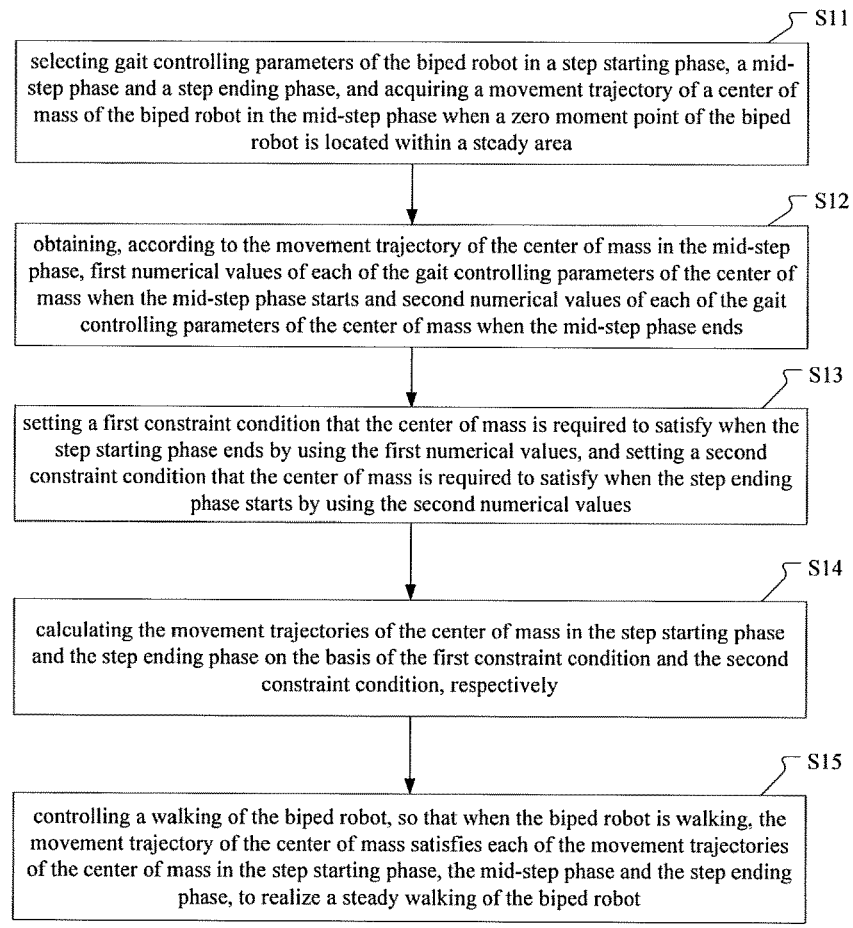
FIG. 1 is the schematic flow chart of a method for controlling a gait of a biped robot according to an embodiment of the present disclosure.

FIG. 1 is the schematic flow chart of a method for controlling a gait of a biped robot according to an embodiment of the present disclosure. Referring to FIG. 1, in the present embodiment, the method for controlling a gait of a biped robot comprises the following steps:

Step S11, selecting gait controlling parameters of the biped robot in a step starting phase, a mid-step phase and a step ending phase, and acquiring a movement trajectory of a center of mass of the biped robot in the mid-step phase when a zero moment point (for short, ZMP) of the biped robot is located within a steady area;

Step S12, obtaining, according to the movement trajectory of the center of mass in the mid-step phase, first numerical values of each of the gait controlling parameters of the center of mass when the mid-step phase starts and second numerical values of each of the gait controlling parameters of the center of mass when the mid-step phase ends;

Step S13, setting a first constraint condition that the center of mass is required to satisfy when the step starting phase ends by using the first numerical values, and setting a second constraint condition that the center of mass is required to satisfy when the step ending phase starts by using the second numerical values;

Step S14, calculating the movement trajectories of the center of mass in the step starting phase and the step ending phase on the basis of the first constraint condition and the second constraint condition, respectively; and Step S15, controlling a walking of the biped robot, so that when the biped robot is walking, the movement trajectory of the center of mass satisfies each of the movement trajectories of the center of mass in the step starting phase, the mid-step phase and the step ending phase, to realize a steady walking of the biped robot.

On the basis of that shown in FIG. 1, in Step S11 the gait controlling parameters comprise three parameters of position, speed and acceleration, or the gait controlling parameters comprise two parameters of position and speed. Further, each parameter of the gait controlling parameters comprises three direction components of a forward direction, a lateral direction and a vertical direction when the biped robot is walking.

It can be known from the method shown in FIG. 1 that, the method for controlling a gait of a biped robot of the present embodiment controls both the movement trajectories of the center of mass of the biped robot in the step starting phase and the step ending phase, and by the controlling, when the biped robot is walking, the movement trajectory of the center of mass satisfies each of the movement trajectories of the center of mass in the step starting phase, the mid-step phase and the step ending phase, to realize a steady walking of the biped robot. Because the acquired movement trajectory of the center of mass in the mid-step phase satisfies the steady walking condition, the stability can also be ensured by controlling the movement trajectories of the center of mass in the step starting phase and the step ending phase by using the corresponding numerical values of the gait controlling parameters that are determined by the movement trajectory of the center of mass in the mid-step phase. That is, compared with the prior art, the method of the present embodiment can ensure the stability in the step starting phase and the step ending phase, and meanwhile achieves better linkings between the step starting phase and the mid-step phase and between the mid-step phase and the step ending phase, which realizes that the biped robot can steadily walk throughout a complete walking process.

The method for controlling a gait of a biped robot of the embodiment of the present disclosure will be described below with reference to a specific biped robot model.

Figure 2:
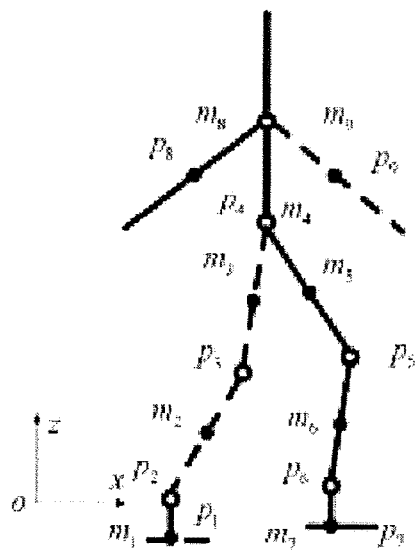
FIG. 2 is the forward direction view of a nine-link model of a biped robot according to an embodiment of the present disclosure.
Figure 3:
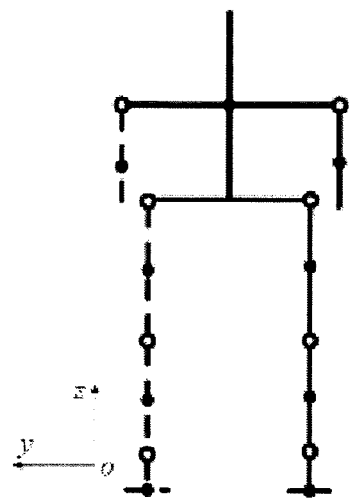
FIG. 3 is the lateral direction view of a nine-link model of a biped robot according to an embodiment of the present disclosure.
Figure 4:
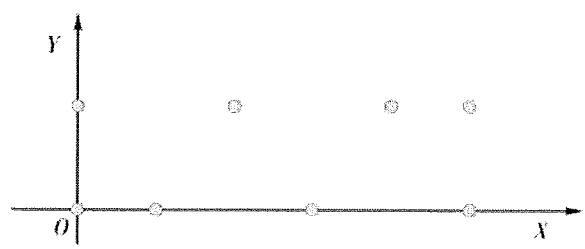
FIG. 4 is the projection schematic representation of the walking position of a biped robot according to an embodiment of the present disclosure.

FIG. 2 is the forward direction view of a nine-link model of a biped robot according to an embodiment of the present disclosure. FIG. 3 is the lateral direction view of a nine-link model of a biped robot according to an embodiment of the present disclosure. FIG. 4 is the projection schematic representation of the walking position of a biped robot according to an embodiment of the present disclosure. Referring to FIG. 2 to FIG. 4, in FIG. 2 P1-P9 individually represent different parts of the biped robot; for example, P8 and P9 represent the left arm and the right arm of the biped robot, and m1-m7 individually represent the masses of the links. In the present embodiment, with the advancing direction of the walking of the biped robot as the X-axis (that is, the forward direction), with a lateral direction of the walking of the biped robot as the Y-axis (such as the right lateral direction of the walking), and with the direction that is up-right and perpendicular to the ground as the Z-axis, a Cartesian coordinate system is constructed. As shown in FIG. 2 and FIG. 3, they show the forward direction view (that is, the xoz plane) and the lateral direction view (that is, the yoz plane) of a simplified model of the biped robot that is constructed by nine homogeneous-material links and joints, in which a single shoulder joint of the biped robot has one degree of freedom of front-and-back swinging, a single ankle joint has two degrees of freedom of front-and-back swinging and left-and-right swinging, a single knee joint has one degree of freedom of front-and-back swinging, and a hip joint has three degrees of freedom of left-and-right swinging, front-and-back swinging and rotation.

Furthermore, in each of the walking gaits of the biped robot, with the projection on the ground of the ankle joint of the supporting leg of the biped robot as the origin of coordinate, with the horizontal advancing direction as the X-axis, and with the lateral direction of the walking as the Y-axis, the planar rectangular coordinate system (XOY) of the biped robot itself is constructed. In the mid-step phase of the continuous walking of the biped robot, at the terminating time moment of the supporting period of each single leg, when the foot connected to the swinging leg swings to a reasonable position, the center of mass of the biped robot has a new supporting point. Further, with the new supporting point as the origin of coordinate, with the horizontal advancing direction as the X-axis, and with the lateral direction of the walking as the Y-axis, the planar rectangular coordinate system (XOY) of the biped robot itself is constructed. The terminating state of the previous supporting point is taken as the initial state, so that the robot starts again a new single step, and by linking those single steps the continuous walking mode of the robot is constructed. As shown in FIG. 4, in the beginning, the projection on the ground of the ankle joint of the right supporting leg is taken as the origin of coordinate (that is, the point O represents the projection in the planar rectangular coordinate system of the right leg of the biped robot, and the point that has a predetermined distance from the point O in the Y-axis direction represents the projection in the planar rectangular coordinate system of the left leg of the biped robot). Correspondingly, the points in the X-axis represent the movement trajectory of the right supporting leg when the biped robot is walking, and the points that are on the left of the X-axis and have a predetermined distance from the X-axis represent the movement trajectory of the left supporting leg.

In an embodiment of the present disclosure, the method is illustratively described by taking the example that the gait controlling parameters are position, speed and acceleration. A solution of controlling a gait of a biped robot must be evaluated in terms of stability, and the present embodiment takes zero moment point (for short, ZMP) as an important base of the stability of the dynamic walking of the biped robot. The ZMP is the point of action of the accumulated force exerted on the sole of the supporting leg of the robot, and at that point the moment of the accumulated force is zero in the horizontal direction. In order to ensure the steady walking of the biped robot, it must be ensured that the ZMP always falls in the steady area at any time moment during the walking process. The steady area refers to the projection on the horizontal plane of the convex-shaped area that is formed by the supporting foot.

The detailed implementation process of controlling by employing the gait controlling method of the present disclosure in a complete walking process of the biped robot will be described below in three phases.

(I) The Controlling of the Movement Trajectory of the Center of Mass in the Mid-Step Phase The mid-step phase is the phase of the smooth periodic walking of the biped robot. A complete single step consists of a one-leg-supporting period (the duration is set as $T_1$) and a two-leg-supporting period (the duration is set as $T_2$), and the whole mid-step phase has a plurality of one-leg-supporting periods and two-leg-supporting periods that appear periodically. The present embodiment, in both the one-leg-supporting periods and the two-leg-supporting periods, employs a linear inverted pendulum model to control the trajectory of the center of mass, to ensure that the walking of the robot satisfies the stability condition (that is, the zero moment point ZMP is always located within the steady area). However, the present disclosure is not limited to the linear inverted pendulum model, and other models can be employed to calculate the movement trajectory of the center of mass.

The method, after acquiring the movement trajectory of the center of mass of the biped robot in the mid-step phase, by using the movement trajectory, obtains the numerical values of each of the gait controlling parameters of the center of mass when the mid-step phase starts as first numerical values, and obtains the numerical values of each of the gait controlling parameters of the center of mass when the mid-step phase ends as second numerical values. More specially, the method is to obtain the following information of the biped robot: when the mid-step phase starts, the position $X_d(0)$, speed $\dot{X}_d(0)$ and acceleration $\ddot{X}_d(0)$ in the x-axis direction and the position $Y_d(0)$, speed $\dot{Y}_d(0)$ and acceleration $\ddot{Y}_d(0)$ in the y-axis direction of the coordinate system of the center of mass; and when the mid-step phase ends, the position $X_s(0)$, speed $\dot{X}_s(0)$ and acceleration $\ddot{X}_s(0)$ in the x-axis direction and the position $Y_s(0)$, speed $\dot{Y}_s(0)$ and acceleration $\ddot{Y}_s(0)$ in the y-axis direction of the coordinate system of the center of mass. If the walking stability is to be kept throughout the whole mid-step phase, it is set that the height of the center of mass of the biped robot is not changed, that is, the position of the center of mass in the z-axis direction is not changed, and the speed and the acceleration are both equal to 0, so the movement trajectory in the Z-axis direction can be known in advance. As for the scenes in which the height of the center of mass changes in the mid-step phase, it is required to acquire the heights of the center of mass when the mid-step phase starts and when the mid-step phase ends (that is, the special numerical values in the z-axis direction).

Figure 5:
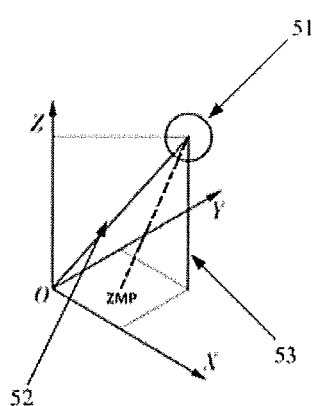
FIG. 5 is the schematic representation of the principle of a linear inverted pendulum model.

In the present embodiment, the above first numerical values and second numerical values are acquired from the calculation results of the linear inverted pendulum model. However, the constructing of the linear inverted pendulum model and the calculating by using the linear inverted pendulum model are not the key of the embodiments of the present disclosure, and can be implemented by using the prior art, and the detailed calculating method will not be in detail described and will only be described briefly as follows. In order to improve the stability of the walking movement of the biped robot, the method simplifies the robot in the two-leg-supporting periods as a virtual linear inverted pendulum model. FIG. 5 is the schematic representation of the principle of the linear inverted pendulum model that the present embodiment employs. As shown in FIG. 5, the model takes the ZMP of the movement of the robot as a virtual supporting point and the center of mass 51 of the robot as the mass point of the linear inverted pendulum model, the supporting foot 52 and the supporting foot 53 are the two supporting feet of the robot in the two-leg-supporting periods, and the ZMP is the virtual supporting point of the inverted pendulum and is located between the two supporting feet. The characteristic of the inverted pendulum model is that the height of the center of mass remains unchanged, and the bottom end of the swinging rod does not provide moment of force. That is, in the mid-step phase, the height of the center of mass of the biped robot in the vertical direction is not changed and is a predetermined value Hz.

The present embodiment firstly designs the movement trajectory of the ZMP in the two-leg-supporting period, and then solves the movement trajectory of the center of mass. Such a solution can not only ensure that the ZMP smoothly moves from the previous supporting foot to the subsequent supporting foot, but also can ensure the continuity of the change of the speed of the center of mass, thereby enhancing the stability of the walking movement of the robot.

As shown in FIG. 5, the equations of movement of the center of mass in the X-axis direction and the Y-axis direction in the two-leg-supporting period are:

$$\ddot{x} = \frac{g}{Hz}(x - x_{ZMP}) \quad \text{Formula (1)}$$

$$\ddot{y} = \frac{g}{Hz}(y - y_{ZMP}) \quad \text{Formula (2)}$$

wherein, the $x_{ZMP}$ in Formula (1) is the x-axis coordinate of the ZMP, the $y_{ZWP}$ in Formula (2) is the y-axis coordinate of the ZMP, Hz is the height of the center of mass in the mid-step phase, and g is gravitational acceleration. In the one-leg-supporting periods of the biped robot, the supporting foot is the position of the ZMP, then $x_{ZMP}=0$, and $y_{ZWP}=0$. The equations of movement of the center of mass in the x-axis direction and the y-axis direction in the one-leg-supporting period are:

$$\ddot{x} = \frac{g}{Hz}x \quad \text{Formula (3)}$$

$$\ddot{y} = \frac{g}{Hz}y \quad \text{Formula (4)}$$

In the two-leg-supporting period, the positions $x_{ZMP}$ and $y_{ZMP}$ of the ZMP are required to be in advance reasonably designed within the supporting area that is formed by the two feet of the robot, so that they can smoothly move within the supporting area. In addition, the a constraint relation of the boundary condition between the two-leg-supporting period and the one-leg-supporting period is well handled, that is, the boundaries between Formulas (1), (2) and Formulas (3), (4) maintain continuous, to ensure that they can smoothly transit.

By using the above Formulas (1) to (4), the method can solve the trajectory of the center of mass in the x-axis direction and the y-axis direction at the starting time moment in the two-leg-supporting period in the mid-step phase, and can solve first numerical values $X_d(0)$, $\dot{X}_d(0)$, $\ddot{X}_d(0)$, $Y_d(0)$, $\dot{Y}_d(0)$ and $\ddot{Y}_d(0)$ respectively corresponding to each of the gait controlling parameters, namely position, speed and acceleration, at the starting time moment in the two-leg-supporting period and can solve second numerical values $X_s(0)$, $\dot{X}_s(0)$, $\ddot{X}_s(0)$, $Y_s(0)$, $\dot{Y}_s(0)$ and $\ddot{Y}_s(0)$ respectively corresponding to each of the gait controlling parameters, namely position, speed and acceleration, at the starting time moment in the one-leg-supporting period and then uses the acquired first numerical values and the second numerical values for the controlling of the movement trajectory of the center of mass in the step starting phase and the step ending phase.

(II) The Controlling of the Movement Trajectory of the Center of Mass in the Step Starting Phase The step starting phase is the transition phase between the static standing state when the two feet of the robot are parallel and close and the mid-step gait that has a steady periodicity. The duration of this phase is set as $T_1$. A first constraint condition that the center of mass satisfies when the step starting phase ends comprises: a first forward direction constraint condition (that is, the constraint condition in the x-axis direction), a first lateral direction constraint condition (that is, the constraint condition in the y-axis direction) and a first vertical direction constraint condition (that is, the constraint condition in the z-axis direction).

The Controlling of the Movement Trajectory of the Center of Mass in the z-Axis Direction In the step starting phase, because the robot is to accelerate from static state to the walking speed, in order to reduce the energy consumption of the system, according to the law of mechanical energy conservation, the embodiment of the present disclosure converts potential energy into kinetic energy as far as possible by lowering the center of gravity of the robot, so that the robot can enter the mid-step phase faster (that is, realizing the advantageous effect of starting in one step). In the present embodiment, the method, according to the initial speed of the center of mass when the mid-step phase starts that is expected to reach (here the time when the mid-step phase starts refers to the starting time moment of the two-leg-supporting period that closest links to the step starting phase), and the conversion relation between kinetic energy and potential energy, calculate a height Hz of the center of mass in the vertical direction of the biped robot when the step starting phase ends. Specially, the method firstly estimates by the following Formula (5) the approximate distance $\Delta z$ by which the center of gravity is to descend.

$$mg\Delta z = \tfrac{1}{2}m(v_1^2 - v_0^2) \quad \text{Formula (5)}$$

wherein, the initial speed $v_0=0$ of the center of mass in the step starting phase, $v_1$ is the final speed of the center of mass in the step starting phase, and is the initial speed of the center of mass when the mid-step phase starts that is expected to reach (the numerical value can be set according to the practical needs), m is the mass of the robot, and g is gravitational acceleration.

Because in the mid-step phase the calculating of the movement trajectory of the center of mass is performed by using the linear inverted pendulum model, in the mid-step phase the height of the center of mass is required to be maintained unchanged, that is, equal to the height Hz of the center of mass at the ending time moment in the step starting phase. The first vertical direction constraint condition of the center of mass comprises: when the step starting phase starts, the value of the position parameter is equal to the initial height of the center of mass of the biped robot, the value of the speed parameter is equal to 0, and the value of the acceleration parameter is equal to 0; and when the step starting phase ends, the value of the position parameter is equal to the height Hz of the center of mass in the vertical direction when the step starting phase ends, the value of the speed parameter is equal to 0, and the value of the acceleration parameter is equal to 0. Therefore it can be known that, the first constraint condition that the center of mass of the robot is required to satisfy in the z-axis direction at the ending time moment in the step starting phase is as follows:

$$\begin{cases} Z(0) = Hz_0 \\ \dot{Z}(0) = 0 \\ \ddot{Z}(0) = 0 \\ Z(T_1) = Hz \\ \dot{Z}(T_1) = 0 \\ \ddot{Z}(T_1) = 0 \end{cases} \quad \text{Formula (6)}$$

wherein, $Z(t)$ is the position of the center of mass in the z-axis direction, $\dot{Z}(t)$ is the speed of the center of mass in the z-axis direction, $\ddot{Z}(t)$ is the acceleration of the center of mass in the z-axis direction, t is the time, $Hz_0$ is the initial height of the center of mass of the biped robot (that is, the height when t is equal to 0), and Hz is the height of the center of mass at the ending time moment (that is, when t is equal to $T_1$) in the step starting phase.

It should be noted that, in Formula (6) the height Hz of the center of mass at the ending time moment in the step starting phase can be determined from a difference value between the initial height $Hz_0$ of the center of mass and a descending distance $\Delta z$, and can also be a value whose difference from the difference value is no greater than a predetermined value. That is, the specific numerical value of the Hz can be equal to the difference value that is obtained by subtracting the $\Delta z$ from the $Hz_0$, and can also be equal to a value that is near the difference value, which is not limited, provided that a preferred value can be acquired to ensure the stability of the walking. It can be understood that, the first numerical value of each of the gait controlling parameters can take other numerical values that are near the numerical value on the right side of each of the equations in Formula (6) and do not have too large deviations.

The method, after obtaining the first constraint condition that the center of mass satisfies in the z-axis direction at the ending time moment in the step starting phase, by using polynomial interpolation, according to the first constraint condition, can obtain the trajectory Z(t) of the center of mass in the z-axis direction as:

$$Z(t)=a_0+a_1 t+a_2 t^2+a_3 t^3+a_4 t^4+a_5 t^5 \quad \text{Formula (7)}$$

wherein, the $a_0$ to $a_5$ are specific parameters, and by substituting the corresponding parameter values in Formula (6) into Formula (7), it can obtain the trajectory of the center of mass in the z-axis direction that varies with the time t by calculating.

In practical applications, in order to calculate the trajectory of the center of mass in the z-axis direction that varies with the time t, the method can firstly calculate the first-order derivative in Formula (7), to obtain the speed of the center of mass in the z-axis direction as:

$$\dot{Z}(t)=a_1+2a_2 t+3a_3 t^2+4a_4 t^3+5a_5 t^4 \quad \text{Formula (7.1)}$$

then, calculate the first-order derivative in Formula (7.1), to obtain the acceleration of the center of mass in the z-axis direction as:

$$\ddot{Z}(t)=2a_2+6a_3 t+12a_4 t^2+20a_5 t^3 \quad \text{Formula (7.2)}$$

by individually substituting the corresponding parameter values in Formula (6) into Formula (7), Formula (7.1) and Formula (7.2), obtain an equation set consisting of 6 equations, and by solving the equation set, obtain the parameters $a_0$, $a_1$, $a_2$, $a_3$, $a_4$, and $a_5$, thereby realizing obtaining the trajectory of the center of mass in the z-axis direction that varies with the time t by calculating by Formula (7).

The Movement Trajectory of the Center of Mass in the x-Axis Direction

In the x-axis direction, the first forward direction constraint condition that the center of mass satisfies comprises: when the step starting phase starts, the value of the position parameter, the value of the speed parameter and the value of the acceleration parameter are all equal to 0; and when the step starting phase ends, the value of the position parameter is equal to a first position parameter forward direction numerical value, the value of the speed parameter is equal to a first speed parameter forward direction numerical value, and the value of the acceleration parameter is equal to a first acceleration parameter forward direction numerical value. That is, the position, speed and acceleration of the center of mass at the initial time moment are all equal to 0. At the ending time moment in the step starting phase, the center of mass is farthest deviated from the supporting point, and if it can be ensured that at this very time the robot can still satisfy the stability condition (that is, the ZMP is within the supporting area), the biped robot will be steady throughout the whole step starting phase. Therefore, the embodiment of the present disclosure sets that the position, speed and acceleration at the ending time moment in the step starting phase are the same as the initial position, speed and acceleration in the two-leg-supporting period in the mid-step phase, to ensure the smooth transition between the gait in the step starting phase and the gait of the mid-step phase. Because the gait controlling by using the linear inverted pendulum model in the mid-step phase satisfies the stability condition, it can be accordingly ensured that the step starting phase also satisfies the stability condition. Therefore, it can be known that, the first constraint condition that the center of mass is required to satisfy in the x-axis direction is as follows:

$$\begin{cases} X(0) = 0 \\ \dot{X}(0) = 0 \\ \ddot{X}(0) = 0 \\ X(T_1) = X_d(0) \\ \dot{X}(T_1) = \dot{X}_d(0) \\ \ddot{X}(T_1) = \ddot{X}_d(0) \end{cases} \quad \text{Formula (8)}$$

wherein, $X(0)$, $\dot{X}(0)$ and $\ddot{X}(0)$ are respectively the position, speed and acceleration of the center of mass of the biped robot in the x-axis direction at the starting time moment in the step starting phase, $X(T_1)$, $\dot{X}(T_1)$ and $\ddot{X}(T_1)$ are respectively the position, speed and acceleration of the center of mass of the biped robot in the x-axis direction at the ending time moment in the step starting phase, and the values of the $X(T_1)$, $\dot{X}(T_1)$ and $\ddot{X}(T_1)$ are the position $X_d(0)$, speed $\dot{X}_d(0)$ and acceleration $\ddot{X}_d(0)$ of the center of mass in the x-axis direction at the starting time moment in the two-leg-supporting period that are obtained in the above mid-step phase by calculating.

The method, after obtaining the first constraint condition that the center of mass satisfies in the x-axis direction at the ending time moment in the step starting phase, by using polynomial interpolation, according to Formula (8), can obtain the trajectory X(t) of the center of mass in the x-axis direction as:

$$X(t)=b_0+b_1 t+b_2 t^2+b_3 t^3+b_4 t^4+b_5 t^5 \quad \text{Formula (9)}$$

wherein, the $b_0$ to $b_5$ are specific parameters, and by substituting the corresponding parameter values in Formula (8) into Formula (9), it can obtain the trajectory of the center of mass in the x-axis direction that varies with the time t by calculating.

The Movement Trajectory of the Center of Mass in the y-Axis Direction

In the present embodiment, in order to facilitate the describing, the distance between the two feet of the robot is set as W. The first lateral direction constraint condition that the center of mass satisfies comprises: when the step starting phase starts, the value of the position parameter is equal to a half of a distance between the two feet of the biped robot, the value of the speed parameter is equal to 0, and the value of the acceleration parameter is equal to 0; and when the step starting phase ends, the value of the position parameter is equal to a first position parameter lateral direction numerical value, the value of the speed parameter is equal to a first speed parameter lateral direction numerical value, and the value of the acceleration parameter is equal to a first acceleration parameter lateral direction numerical value. That is, at the initial time moment in the step starting phase, the center of mass is in an intermediate position of the distance between the two feet, and the speed and the acceleration are both equal to 0. At the ending time moment in the step starting phase, the center of mass is farthest deviated from the supporting point, and the embodiment of the present disclosure sets that the position, speed and acceleration in the y-axis direction at this time are the same as the position, speed and acceleration when the two-leg-supporting period in the mid-step phase starts, to ensure their smooth transition, and to ensure that the step starting phase also satisfies the stability condition. Therefore, the first constraint condition that the center of mass is required to satisfy in the y-axis direction is as follows:

$$\begin{cases} Y(0) = W/2 \\ \dot{Y}(0) = 0 \\ \ddot{Y}(0) = 0 \\ Y(T_1) = Y_d(0) \\ \dot{Y}(T_1) = \dot{Y}_d(0) \\ \ddot{Y}(T_1) = \ddot{Y}_d(0) \end{cases} \quad \text{Formula (10)}$$

wherein, $Y(0)$, $\dot{Y}(0)$ and $\ddot{Y}(0)$ are respectively the position, speed and acceleration of the center of mass at the initial time moment in the step starting phase, $Y(T_1)$, $\dot{Y}(T_1)$ and $\ddot{Y}(T_1)$ are respectively the position, speed and acceleration of the center of mass of the biped robot in the y-axis direction at the terminating time moment in the step starting phase, and the values of the $Y(T_1)$, $\dot{Y}(T_1)$ and $\ddot{Y}(T_1)$ are the position $Y_d(0)$, speed $\dot{Y}_d(0)$ and acceleration $\ddot{Y}_d(0)$ of the center of mass in the y-axis direction when the two-leg-supporting period starts that are obtained in the above mid-step phase by calculating.

The method, after obtaining the first constraint condition that the center of mass satisfies in the y-axis direction at the ending time moment in the step starting phase, by using polynomial interpolation, according to the constraint condition in Formula (10), can obtain the trajectory y(t) of the center of mass in the y-axis direction as:

$$y(t)=c_0+c_1 t+c_2 t^2+c_3 t^3+c_4 t^4+c_5 t^5 \quad \text{Formula(11)}$$

wherein, the $c_0$ to $c_5$ are specific parameters, and by substituting the corresponding parameter values in Formula (10) into Formula (11), can obtain the trajectory of the center of mass in the y-axis direction that varies with the time t by calculating.

(III) The Controlling of the Movement Trajectory of the Center of Mass in the Step Ending Phase The step ending phase refers to the process during which the robot, from the mid-step gait that has a steady periodicity, gradually reduces the speed, till the robot returns the steady static standing state. The duration of the phase is set as $T_1$. The second constraint condition that the center of mass is required to satisfy comprises: a second forward direction constraint condition (that is, the constraint condition in the x-axis direction), a second lateral direction constraint condition (that is, the constraint condition in the y-axis direction) and a second vertical direction constraint condition (that is, the constraint condition in the z-axis direction).

The Movement Trajectory of the Center of Mass in the z-Axis Direction

In the step ending phase, in the z-axis direction, the second vertical direction constraint condition of the center of mass comprises: when the step ending phase starts, the value of the position parameter is equal to the height Hz in the vertical direction when the step starting phase ends, the value of the speed parameter is equal to 0, and the value of the acceleration parameter is equal to 0; and when the step ending phase ends, the value of the position parameter is equal to the initial height of the center of mass of the biped robot, the value of the speed parameter is equal to 0, and the value of the acceleration parameter is equal to 0. Because the robot is to decelerate from the walking speed in the mid-step phase to 0, in order to accelerate the step ending process, the directions of the energy conversion of the step ending phase and the step starting phase are opposite, and according to the law of mechanical energy conservation, the embodiment of the present disclosure, by lifting the center of gravity of the robot, that is, lifting from the height Hz of the center of mass in the mid-step phase to the height $Hz_0$ when the step starting phase starts, converts kinetic energy into potential energy as far as possible, so that the robot enters the steady static state faster (that is, realizing the advantageous effect of ending steps in one step).

In the z-axis direction, in order to realize the walking stability, the embodiment of the present disclosure sets that the position, speed and acceleration at the initial time moment in the step ending phase are the same as the position, speed and acceleration of the center of mass at the ending time moment (that is, when the one-leg-supporting period starts) in the mid-step phase. Therefore, the method can obtain the second constraint condition that the center of mass of the robot is required to satisfy in the z-axis direction at the starting time moment in the step ending phase as follows:

$$\begin{cases} Z(0) = Zc \\ \dot{Z}(0) = 0 \\ \ddot{Z}(0) = 0 \\ Z(T_1) = Zc_0 \\ \dot{Z}(T_1) = 0 \\ \ddot{Z}(T_1) = 0 \end{cases} \quad \text{Formula (12)}$$

wherein, $Z(0)$, $Z(T_1)$ and $\ddot{Z}(T_1)$ are respectively the position, speed and acceleration of the center of mass in the z-axis direction at the initial time moment in the step ending phase, $Z(T_1)$, $\dot{Z}(T_1)$ and $\ddot{Z}(T_1)$ are respectively the position, speed and acceleration of the center of mass of the biped robot in the z-axis direction at the terminating time moment in the step ending phase, $Zc_0$ is the height of the center of mass at the initial time moment in the step ending phase (which can be equal to the height $Hz$ of the center of mass in the mid-step phase), and $Zc_0$ is the height of the center of mass of the biped robot in the step ending phase in the initial steady standing state (which can be equal to the initial height $Hz_0$ of the center of mass in the step starting phase). It should be noted that, the second numerical value of each of the gait controlling parameters can take other numerical values that are near the numerical value on the right side of each of the equations in Formula (12) and do not have too large deviations, and are not limited to the numerical values that are exemplified on the right side of each of the equations in Formula (12).

The method, after obtaining the second constraint condition that the center of mass satisfies in the z-axis direction at the starting time moment in the step ending phase, by using polynomial interpolation, according to the constraint condition (12), can obtain the trajectory $Z(t)$ of the center of mass in the z-axis direction by:

$$Z(t)=a'_0+a'_1 t+a'_2 t^2+a'_3 t^3+a'_4 t^4+a'_5 t^5 \qquad \text{Formula (13)}$$

wherein, the $a'_0$ to $a'_5$ are specific parameters, and by substituting the corresponding parameter values in Formula (12) into Formula (13), can obtain the trajectory of the center of mass in the z-axis direction that varies with the time t by calculating.

The Movement Trajectory of the Center of Mass in the x-Axis Direction

In the x-axis direction, the second forward direction constraint condition of the center of mass comprises: when the step ending phase starts, the value of the position parameter is equal to a second position parameter forward direction numerical value, the value of the speed parameter is equal to a second speed parameter forward direction numerical value, and the value of the acceleration parameter is equal to a second acceleration parameter forward direction numerical value; and when the step ending phase ends, the value of the position parameter, the value of the speed parameter and the value of the acceleration parameter are all equal to 0. The embodiment of the present disclosure sets that the position, speed and acceleration of the center of mass at the initial time moment in the step ending phase are respectively the same as the position, speed and acceleration at the ending time moment in the two-leg-supporting period in the mid-step phase, and according to symmetry and continuity, that is, they are respectively the same as the position, speed and acceleration at the starting time moment in the one-leg-supporting period in the mid-step phase, to ensure their smooth transition, and to ensure that the step ending phase also satisfies the stability condition. However, the position, speed and acceleration of the center of mass at the ending time moment in the step ending phase are all equal to 0, to return the steady static standing state. Therefore, it can be known that, the second constraint condition that the center of mass satisfies at the starting time moment in the step ending phase is as follows:

$$\begin{cases} X(0) = X_s(0) \\ \dot{X}(0) = \dot{X}_s(0) \\ \ddot{X}(0) = \ddot{X}_s(0) \\ X(T_1) = 0 \\ \dot{X}(T_1) = 0 \\ \ddot{X}(T_1) = 0 \end{cases} \qquad \text{Formula (14)}$$

wherein, the values of the position $X(0)$, speed $\dot{X}(0)$ and acceleration $\ddot{X}(0)$ of the center of mass at the starting time moment in the step ending phase are respectively the position $X_s(0)$, speed $\dot{X}_s(0)$ and acceleration $\ddot{X}_s(0)$ of the center of mass in the x-axis direction at the starting time moment in the one-leg-supporting period that are obtained in the above mid-step phase by calculating. At the terminating time moment in the step ending phase the position $X(T_1)$ of the center of mass is equal to 0, the speed $\dot{X}(T_1)$ is equal to 0 and the acceleration $\ddot{X}(T_1)$ is equal to 0.

The method, after obtaining the second constraint condition that the center of mass satisfies in the x-axis direction at the starting time moment in the step ending phase, by using polynomial interpolation, according to the constraint condition in Formula (14), can obtain the trajectory $X(t)$ of the center of mass in the x-axis direction as:

$$X(t)=b'_0+b'_1 t+b'_2 t^2+b'_3 t^3+b'_4 t^4+b'_5 t^5 \qquad \text{Formula (15)}$$

wherein, the $b'_0$ to $b'_5$ are specific parameters, and by substituting the corresponding parameter values in Formula (14) into Formula (15), can obtain the trajectory of the center of mass in the x-axis direction that varies with the time t by calculating.

The Movement Trajectory of the Center of Mass in the y-Axis Direction

In the y-axis direction, the second lateral direction constraint condition of the center of mass comprises: when the step ending phase starts, the value of the position parameter is equal to a second position parameter lateral direction numerical value, the value of the speed parameter is equal to a second speed parameter lateral direction numerical value, and the value of the acceleration parameter is equal to a second acceleration parameter lateral direction numerical value; and when the step ending phase ends, the value of the position parameter is equal to a half of a distance between the two feet of the biped robot, and the value of the speed parameter and the value of the acceleration parameter are both equal to 0. The present embodiment sets that the position, speed and acceleration of the center of mass at the starting time moment in the step ending phase are respectively the same as the position, speed and acceleration at the ending time moment in the two-leg-supporting period in the mid-step phase, and according to symmetry and continuity, that is, they are respectively the same as the position, speed and acceleration at the starting time moment in the one-leg-supporting period in the mid-step phase, to ensure their smooth transition, and to ensure that the step ending phase also satisfies the stability condition. At the terminating time moment in the step ending phase the center of mass is located in the intermediate position of the distance between the two feet, and the speed and the acceleration are both equal to 0, to return the steady static standing state. Therefore, it can be known that, the second constraint condition that the center of mass satisfies in the y-axis direction at the starting time moment in the step ending phase is as follows:

$$\begin{cases} Y(0) = Y_s(0) \\ \dot{Y}(0) = \dot{Y}_s(0) \\ \ddot{Y}(0) = \ddot{Y}_s(0) \\ Y(T_1) = W/2 \\ \dot{Y}(T_1) = 0 \\ \ddot{Y}(T_1) = 0 \end{cases} \quad \text{Formula (16)}$$

wherein, the position Y(0), speed $\dot{Y}(0)$ and acceleration $\ddot{Y}(0)$ of the center of mass at the starting time moment in the step ending phase are respectively equal to the position $Y_s(0)$, speed $\dot{Y}_s(0)$ and acceleration $\ddot{Y}_s(0)$ of the center of mass in the y-axis direction at the starting time moment in the one-leg-supporting period that are obtained in the above mid-step phase by calculating.

The method, after obtaining the second constraint condition that the center of mass satisfies in the y-axis direction at the starting time moment in the step ending phase, by using polynomial interpolation, according to the constraint condition in Formula (16), can obtain the trajectory y(t) of the center of mass in the y-axis direction as:

$$Y(t)=c'_0+c'_1t+c'_2t^2+c'_3t^3+c'_4t^4+c'_5t^5 \quad \text{Formula (17)}$$

wherein, the $c'_0$ to $c'_5$ are specific parameters, and by substituting the corresponding parameter values in Formula (16) into Formula (17), can obtain the trajectory of the center of mass in the y-axis direction that varies with the time t by calculating.

By now, the movement trajectories of the center of mass of the biped robot in the mid-step phase, the step starting phase and the step ending phase can be obtained.

It should be understood that, in the above embodiments, the method is illustratively described by taking the example that the gait controlling parameters comprise position, speed and acceleration; however, in other embodiments of the present disclosure, the gait controlling parameters can comprise position and speed, and when the gait controlling parameters are position and speed, the position parameter and the speed parameter both comprise three direction components of a forward direction, a lateral direction and a vertical direction when the biped robot is walking. The specific calculating processes can be seen in the relevant descriptions of the above embodiments, and will not be in detail described here.

Another embodiment of the present disclosure controls the movements of the joint points on the two legs on the basis of the movement trajectory of the center of mass. In order to further realize the stability of the walking of the biped robot, the method further comprises: calculating, according to an expected movement height of ankle joints of the biped robot, the movement trajectories of the ankle joints of the two legs in the step starting phase, the mid-step phase and the step ending phase; by using the movement trajectories of the ankle joints, calculating the expected angular trajectories of the ankle joints in each of the phases; according to the structural position relations between the center of mass, the knee joints and the ankle joints of the biped robot in each of the phases and the movement trajectories of the center of mass and the ankle joints in each of the phases in walking, obtaining the movement trajectories of the knee joints in each of the phases by calculating; and by using the movement trajectories of the knee joints in the step starting phase, the mid-step phase and the step ending phase, calculating the expected angular trajectories of the knee joints in each of the phases.

During the process of the swinging of the swinging leg of the biped robot, the ankle joint of the swinging leg must pass through three key points, namely, a starting point, a highest point and a terminating point. According to the constraint conditions of the position, speed and acceleration at the three points, similar to those described above, the method can solve the movement trajectory of the ankle joint of the swinging leg by using polynomial interpolation.

Figure 6:
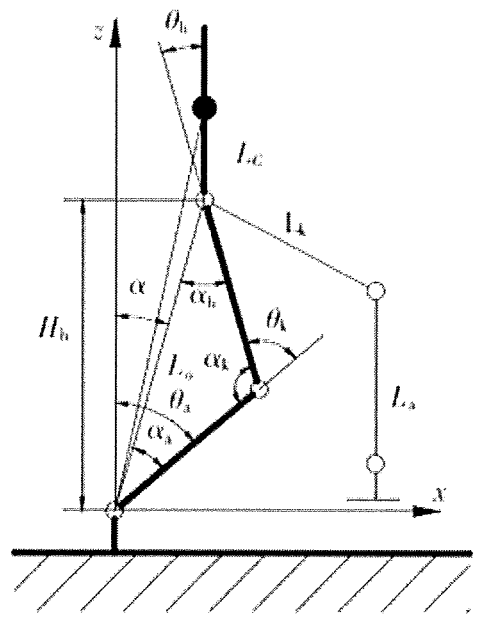
FIG. 6 is the forward direction schematic representation of the supporting leg of a biped robot according to an embodiment of the present disclosure.
Figure 7:
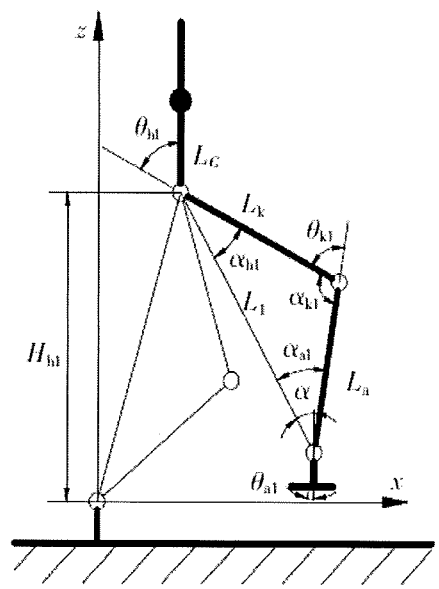
FIG. 7 is the forward direction schematic representation of the swinging leg of a biped robot according to an embodiment of the present disclosure.

Specifically, FIG. 6 is the forward direction schematic representation of the supporting leg of a biped robot according to an embodiment of the present disclosure. FIG. 7 is the forward direction schematic representation of the swinging leg of a biped robot according to an embodiment of the present disclosure. As shown in FIG. 6 and FIG. 7, in the forward direction plane (that is, the projection of the robot in the xoz plane in moving), $L_c$ represents the distance between the center of mass of the biped robot and the hip joint, $L_k$ represents the distance between the hip joint and the knee joint, $L_a$ represents the distance between the knee joint and the ankle joint, and the $H_h$ in FIG. 6 and the $H_{h1}$ in FIG. 7 represent the distance between the hip joint and the ankle joint. Those distances and the geometrical relations between the hip joint, the knee joint and the ankle joint can be obtained in advance according to the design structure of the robot. Therefore, according to the geometrical relations of the supporting leg of the robot, and referring to the movement trajectory of the center of mass and the movement trajectory of the ankle joint, the method obtains the joint angles of the supporting leg: a joint angle $\theta_a$ of the ankle joint, a joint angle $\theta_k$ of the knee joint and a joint angle $\theta_h$ of the hip joint, and the trajectories of the varying with time of the angles. It can be understood that, the α (that is, the angle between the connecting line connecting a hip joint and an ankle joint and the y-axis), $\alpha_a$, $\alpha_h$, $\alpha_k$ and $\alpha_{a1}$, $\alpha_{h1}$, $\alpha_{k1}$ in FIG. 6 and FIG. 7 are calculation-assisting angles that are used in the intermediate calculating processes.

Figure 8:
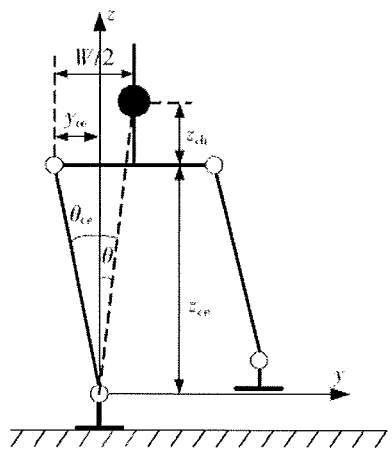
FIG. 8 is the lateral direction schematic representation of the two legs of a biped robot according to an embodiment of the present disclosure.

FIG. 8 is the lateral direction schematic representation of the two legs of a biped robot according to an embodiment of the present disclosure. Similarly, as shown in FIG. 8, in the lateral direction plane (that is, the projection of the robot in the yoz plane in moving), the center of mass (see the black solid circle shown in FIG. 8) is at a half of the distance between the two feet of the biped robot W/2, the distance between the center of mass and the hip joint is $z_{ch}$, the distance between the hip joint and the ankle joint is $z_{ce}$, and the y-coordinate of the hip joint relative to the supporting foot is $y_{ce}$. In order that the robot can steadily walk, the upper part of the body should be kept vertical and the soles should be kept horizontal, so the above walking in a plane can be simplified as an issue of one degree of freedom. The angles that are relevant to the gaits are the rotational freedom (turning around the x-axis) of the ankle joints and the rotational freedom of the hip joints. The two ankle joints have the same angles and directions, and the two hip joints have the same angles themselves and the opposite directions to the ankle joints. According to the geometrical relation of the legs, the movement trajectory of the center of mass and the movement trajectory of the ankle joint, the method can obtain the joint angles of the swinging leg: a joint angle $\theta_{a1}$ of the ankle joint, a joint angle $\theta_{k1}$ of the knee joint and a joint angle $\theta_{h1}$ of the hip joint, and the trajectories of the varying with time of the angles. It can be understood that, the angles θ and $\theta_{ce}$ in FIG. 8 are the left and right angles between the connecting line connecting a hip joint and an ankle joint and the vertical direction when the robot is walking, and are calculation-assisting angles.

Referring to FIG. 6 to FIG. 8, the calculating process of calculating, according to an expected movement height of the ankle joint of the biped robot, the movement trajectory of the ankle joint in the step starting phase, the mid-step phase and the step ending phase is: presetting the expected movement height of the ankle joint (for example, $H_h$), wherein the height is the highest point of the moving of the ankle joint, and the position, speed and acceleration of the starting point of the ankle joint are all equal to 0, the position, speed and acceleration of the terminating point are all equal to 0, and the position of the highest point is $H_h$ and its speed and acceleration are equal to 0; calculating according to those numerical values the constraint condition that the ankle joint satisfies; and according to the constraint condition, by using polynomial interpolation, obtaining the movement trajectory of the ankle joint from the starting point to the highest point and the movement trajectory from the highest point to the terminating point by calculating. In the present embodiment, the method further comprises, according to the movement trajectories of the center of mass and the ankle joint in each of the phases in walking, obtaining the spatial positions where the center of mass and the ankle joint locate at each of the time moments; according to the geometric position relation of the center of mass and the hip joint of the robot, obtaining the spatial position of the hip joint; according to the structural position relations between the hip joint, the knee joint and the ankle joint of the biped robot, referring to structural parameters such as the lengths of the thighs and the shanks and by using triangular geometrical relations, calculating and obtaining the position and angle of the knee joint, further obtaining the movement trajectories of the knee joint in the step starting phase, the mid-step phase and the step ending phase, and meanwhile obtaining the expected angular trajectories of the knee joint in each of the phases.

It should be noted that, in an embodiment of the present disclosure, the joint angles of the ankle joint, the knee joint and the hip joint of the leg of the biped robot are calculated by triangular geometrical relations, but in other embodiments of the present disclosure the above calculating process can also be completed by using other calculating methods, provided that the methods can calculate the expected angles of the leg joints and the hip joints of the biped robot. Other calculating methods comprise, for example, inverse kinematics analysis. Inverse kinematics is solving corresponding joint variables according to known location and position of an end actuator. The prior art provides various calculating solutions (for example, analytic method, geometric method, geometric analytic method and numerical method), and the prior art solutions can realize obtaining the expected angular trajectory of the hip joint (that is, the trajectory that varies with time of the joint angle of the hip joint) according to the movement trajectory of the hip joint. The embodiment of the present disclosure exerts no limit to the inverse kinematics analysis methods. Furthermore, how to solve the expected angular trajectory is not the keynote of the embodiment of the present disclosure, and the specific implementation can employ any solution of inverse kinematics analysis, which will not be in detail described here. In addition, the present embodiment calculates the movement trajectory of the center of mass and the respective movement trajectory of the hip joint and the ankle joint by using polynomial interpolation, but in the technical solutions of the present disclosure the calculating of the movement trajectories of the center of mass, the hip joint and the ankle joint is not limited to polynomial interpolation as in the present embodiment. Other calculating methods that can be implemented can also be employed. The method, after obtaining the expected angular trajectories of the ankle joints, the knee joints and the hip joints of the two legs of the biped robot by calculating, selects one or more of the hip joints, the ankle joints and the knee joints as a controlling point; when the biped robot is walking, detects in real time the turning angle of the controlling point (for example the ankle joint, the knee joint and the hip joint), and performs self-adaptive tracking controlling on the detected turning angles of the hip joints and the ankle joints by using the expected angular trajectories of the ankle joints, the knee joints and the hip joints in each of the phases respectively, to realize a steady walking of the biped robot.

Figure 10:
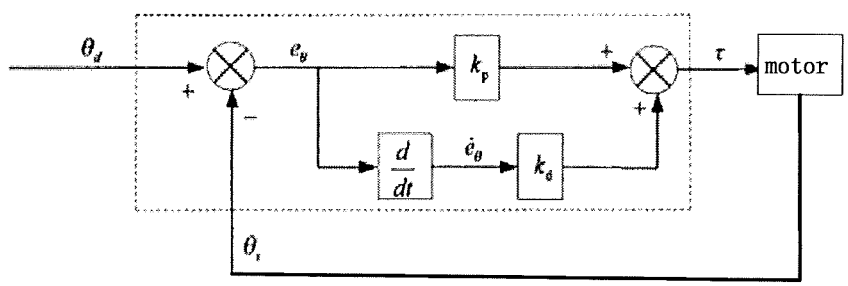
FIG. 10 is the schematic representation of a structure for controlling the angles of the joints of a biped robot according to an embodiment of the present disclosure.

FIG. 10 is the schematic representation of a structure for controlling the angles of the joints of a biped robot according to an embodiment of the present disclosure. In FIG. 10, $\theta_d$ is the expected joint angle, $\theta_r$ is the joint angle that is actually detected, $k_p$ is a proportionality factor, $k_d$ is a differential coefficient, and $\tau$ is the moment of rotation. As shown in FIG. 10, in the present embodiment the method is illustratively described by taking the example of the hip joints. The method, after obtaining the expected angles of the hip joints in each of the phases of the walking of the robot, by using moment of force controlling, by directly taking the detected turning angles of the hip joints as the feedback, obtains the difference between that feedback and the joint turning angles (the expected angles) that are required by the gaits in each of the above phases, controls by using a proportion integration differentiation PID controller or a proportion differentiation PD controller, and outputs the input torque of the hip joints of the biped robot, to thereby drive the movement of the hip joints of the robot, to achieve the aim of steady walking. The solution of the embodiment of the present disclosure simplifies the nonlinear coupling system of the biped robot into a linear multivariable decoupling system by moment of force controlling. In specific implementing each of the joints of the biped robot can be controlled by an individual PID or PD controller, to realize the follow-up controlling on the expected angles of each of the joints, to finally realize the steady operation of the robot following the preset gaits.

It should be noted that, the detailed operating principles of the proportion integration differentiation PID controller or the proportion differentiation PD controller can be seen in the prior art, and will not be in detail described here.

In an embodiment of the present disclosure, in order that the gait of the biped robot is more personified, and to improve the stability, the two arms of the robot are required to cooperate with the legs by front-and-back swinging, and the swinging is required to be symmetrical to the alternate swinging of the two legs. Therefore, the gait controlling method further comprises: selecting angle controlling parameters of swingings of shoulder joints of the biped robot: angular displacement, angular speed and angular acceleration; according to angular displacement values, angular speed values and angular acceleration values that a shoulder joint corresponding to the swinging leg is expected to reach at a starting time moment and an terminating time moment of the swinging of a swinging leg of the biped robot in the mid-step phase respectively, setting an angular constraint condition that the shoulder joint corresponding to the swinging leg is required to satisfy; according to the angular constraint condition and by using polynomial interpolation, calculating expected angular trajectory of the swinging of the shoulder joint in the mid-step phase; by using an angular displacement value, an angular speed value and an angular acceleration value that a shoulder joint corresponding to the swinging leg is expected to reach at a starting time moment of the swinging of a swinging leg of the biped robot in the mid-step phase, and, setting a first angular constraint condition that the shoulder joint is required to satisfy in the step starting phase, and a second angular constraint condition that the shoulder joint is required to satisfy in the step ending phase; according to the first angular constraint condition and the second angular constraint condition and by using polynomial interpolation, calculating the expected angular trajectory of the swinging of the shoulder joint in the step starting phase and the expected angular trajectory of the swinging of the shoulder joint in the step ending phase; and when the biped robot is walking, detecting in real time a turning angle of the shoulder joint, and performing self-adaptive tracking controlling on the detected turning angle of the shoulder joint by using the expected angular trajectories of the shoulder joint in each of the phases. By that, the method realizes the cooperation between the movements of the two arms and the legs when the biped robot is steady walking, and the walking is more personified.

Figure 9:
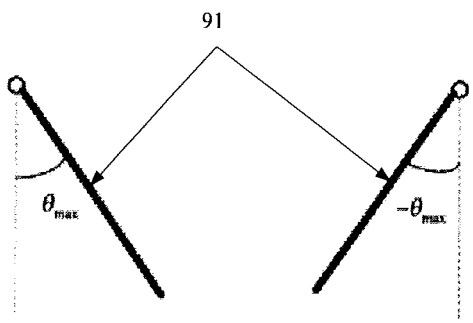
FIG. 9 is the schematic representation of the swinging angles of the shoulder joints of a biped robot according to an embodiment of the present disclosure.

FIG. 9 is the schematic representation of the swinging angles of the shoulder joints of a biped robot according to an embodiment of the present disclosure. Specifically, in one single step period $T=T_1+T_2$ of the mid-step phase, as shown in FIG. 9, assuming that the right leg is the swinging leg, the right shoulder joint 91 reaches the maximum value and the minimum value of the swinging angle respectively at the starting time moment and the terminating time moment of the single step period, and the angular constraint condition can be obtained as:

$$\begin{cases} \theta(0) = \theta_{max} \\ \dot{\theta}(0) = 0 \\ \ddot{\theta}(0) = 0 \\ \theta(T) = -\theta_{max} \\ \dot{\theta}(T) = 0 \\ \ddot{\theta}(T) = 0 \end{cases} \quad \text{Formula (18)}$$

wherein, $\theta(0)$ is the angular displacement of the swinging of the right shoulder joint at the starting time moment in the single step period in the mid-step phase, $\dot{\theta}(0)$ represents the angular speed, $\ddot{\theta}(0)$ represents the angular acceleration, $\theta(T)$ is the angular displacement of the swinging of the right shoulder joint at the terminating time moment in the single step period in the mid-step phase, $\dot{\theta}(T)$ represents the angular speed, $\ddot{\theta}(T)$ represents the angular acceleration, and wherein, $\theta_{max}$ is the maximum value of the swinging angle that is expected to reach, and $-\theta_{max}$ is the minimum value of the swinging angle that is expected to reach, wherein the minus sign here represents the direction.

According to the angular constraint condition in Formula (18), the method can obtain the expected angular trajectory of the swinging of the right shoulder joint in the mid-step phase as:

$$\theta(t)=d_0+d_1t+d_2t^2+d_3t^3+d_4t^4+d_5t^5 \quad \text{Formula (19)}$$

wherein the $d_0$ to $d_5$ in Formula (19) are parameters, and by substituting the corresponding parameter values in Formula (18) into Formula (19), it can obtain the expected angular trajectory by calculating.

Moreover, the angles of the swinging of the left shoulder joint are symmetrical with those in the front-and-back direction.

Regarding the step starting phase, the initial values of the swinging angles of the shoulder joints are equal to 0, and regarding the step ending phase, the end values of the swinging angles of the shoulder joints are equal to 0; further, they are required to link with the swinging angles in the mid-step gait. The method, after obtaining the first angular constraint condition and the second angular constraint condition, similarly can obtain the expected angular trajectories of the swinging angles of the shoulder joints in the step starting phase and the step ending phase. Specially, at the terminating time moment in the step starting phase, the first angular constraint condition that the swinging angle of the right shoulder joint satisfies is:

$$\begin{cases} \theta(0) = 0 \\ \dot{\theta}(0) = 0 \\ \ddot{\theta}(0) = 0 \\ \theta(T) = \theta_{max} \\ \dot{\theta}(T) = 0 \\ \ddot{\theta}(T) = 0 \end{cases} \quad \text{Formula (20)}$$

According to the first angular constraint condition in Formula (20), the method can obtain the expected angular trajectory of the swinging of the right shoulder joint in the step starting phase as:

$$\theta(t)=e_0+e_1t+e_2t^2+e_3t^3+e_4t^4+e_5t^5 \quad \text{Formula (21)}$$

and by substituting the parameter values in the first angular constraint condition in Formula (20) into Formula (21), it can obtain the trajectory of the swinging angle of the right shoulder joint in the step starting phase that varies with time.

At the starting time moment in the step ending phase, the second angular constraint condition that the swinging angle of the right shoulder joint satisfies is:

$$\begin{cases} \theta(0) = -\theta_{max} \\ \dot{\theta}(0) = 0 \\ \ddot{\theta}(0) = 0 \\ \theta(T) = 0 \\ \dot{\theta}(T) = 0 \\ \ddot{\theta}(T) = 0 \end{cases} \quad \text{Formula (22)}$$

According to the second angular constraint condition in Formula (22), the method can obtain the expected angular trajectory of the swinging of the right shoulder joint at the starting time moment in the step ending phase as:

$$\theta(t)=f_0+f_1t+f_2t^2+f_3t^3+f_4t^4+f_5t^5 \quad \text{Formula (23)}$$

Moreover, the angles of the swinging of the left shoulder joint are symmetrical with those in the front-and-back direction. The specific calculating process can be seen in the above description on the trajectory of the angle in the single step period in the mid-step phase, and will not be in detail described here.

It can be known from the descriptions of the above embodiments that, regarding the problem in the prior art that the step starting phase and the step ending phase have poor walking stability, which easily causes the destabilization of the walking of the robot and affects the walking of the robot, the embodiments of the present disclosure, after the biped robot enters the mid-step gait, control the position of the center of mass of the robot by using the linear inverted pendulum model (that is, solves the first numerical values and the second numerical values of each of the gait controlling parameters), to increase the walking stability and prevent the instability and the impact on the robot that are caused by the instant switching of the supporting leg in the mid-step phase of the periodical walking. Subsequently, the embodiments of the present disclosure, by using polynomial interpolation, determine the first constraint condition that the center of mass satisfies in the step starting phase and the second constraint condition that the center of mass satisfies in the step ending phase respectively according to the first numerical values and the second numerical values corresponding to each of the gait controlling parameters, thereby controlling both the moving trajectories of the center of mass of the biped robot in the step starting phase and the step ending phase, and controlling the walking of the biped robot, so that when the biped robot is walking the movement trajectory of the center of mass satisfies each of the movement trajectories of the center of mass in the step starting phase, the mid-step phase and the step ending phase, to realize a steady walking of the biped robot. Further, the solutions, by using the kinetic energy that is converted from the potential energy of the robot, realize entering the normal mid-step walking state in one step in the step starting phase, and, by converting kinetic energy into potential energy, complete the step ending process in one step in the step ending phase, and cause the step starting phase and the step ending phase to continuously link with the mid-step gait, to satisfy the steady walking condition, and to realize the high-efficiency and steady starting and ending of the walking process. The solutions, after obtaining the trajectories of the center of mass in the step starting phase, the mid-step phase and the step ending phase, calculate the joint turning angles of the hip joints, the knee joints and the ankle joints of the two legs by the structural features of the robot and inverse kinematics analysis. Finally, the solutions, by the controlling on each of the joint turning angles of the biped robot, further ensure the stability of the center of mass in walking, and realize the walking stability of the biped robot.

In another embodiment of the present disclosure, there is further provided a device for controlling a gait of a biped robot, the device comprising:

a center of mass mid-step phase trajectory acquiring unit, for selecting gait controlling parameters of the biped robot in a step starting phase, a mid-step phase and a step ending phase, and acquiring a movement trajectory of a center of mass of the biped robot in the mid-step phase when a zero moment point of the biped robot is located within a steady area; a parameter value acquiring unit, for obtaining, according to the movement trajectory of the center of mass in the mid-step phase, first numerical values of each of the gait controlling parameters of the center of mass when the mid-step phase starts and second numerical values of each of the gait controlling parameters of the center of mass when the mid-step phase ends; a constraint condition setting unit, for setting a first constraint condition that the center of mass is required to satisfy when the step starting phase ends by using the first numerical values, and setting a second constraint condition that the center of mass is required to satisfy when the step ending phase starts by using the second numerical values; a center of mass step starting and step ending phase trajectory calculating unit, for calculating the movement trajectories of the center of mass in the step starting phase and the step ending phase on the basis of the first constraint condition and the second constraint condition, respectively; and a center of mass trajectory controlling unit, for controlling a walking of the biped robot, so that when the biped robot is walking, the movement trajectory of the center of mass satisfies each of the movement trajectories of the center of mass in the step starting phase, the mid-step phase and the step ending phase, to realize a steady walking of the biped robot.

In an embodiment of the present disclosure, the center of mass trajectory controlling unit comprises: an ankle joint trajectory calculating unit, a hip joint trajectory calculating unit, a joint angle calculating unit and a joint angle controlling unit; the ankle joint trajectory calculating unit is for calculating, according to an expected movement height of ankle joints of the biped robot, the movement trajectories of the ankle joints of the two legs in the step starting phase, the mid-step phase and the step ending phase; the hip joint trajectory calculating unit is for calculating, according to the movement trajectories of the center of mass in each of the phases, the movement trajectories of hip joints of the biped robot in the step starting phase, the mid-step phase and the step ending phase; the joint angle calculating unit is for, by using the movement trajectories of the hip joints and the ankle joints in each of the phases, the structural position relations of the legs of the biped robot and a leg length numerical value, obtaining expected angular trajectories of the hip joints, the ankle joints and knee joints in each of the phases by calculating; and the joint angle controlling unit is for selecting one or more of the hip joints, the ankle joints and the knee joints as a controlling point(s); and when the biped robot is walking, detecting in real time a turning angle of the controlling point, and performing self-adaptive tracking controlling on the detected turning angle of the controlling point by using the expected angular trajectories of the controlling point in each of the phases, so that when the biped robot is walking the movement trajectory of the center of mass satisfies each of the movement trajectories of the center of mass in the step starting phase, the mid-step phase and the step ending phase.

In the present embodiment, each parameter of the gait controlling parameters comprises three direction components of a forward direction, a lateral direction and a vertical direction when the biped robot is walking; wherein, the gait controlling parameters comprise position and speed, or the gait controlling parameters comprise position, speed and acceleration.

In an embodiment of the present disclosure, the center of mass mid-step phase trajectory acquiring unit is specifically for that each parameter of the acquired gait controlling parameters comprises three direction components of a forward direction, a lateral direction and a vertical direction when the biped robot is walking; wherein, the gait controlling parameters comprise position and speed, or the gait controlling parameters comprise position, speed and acceleration.

In an embodiment of the present disclosure, the center of mass step starting and step ending phase trajectory calculating unit is further for, according to an initial speed of the center of mass when the mid-step phase starts that is expected to reach and a conversion relation between kinetic energy and potential energy, calculating a height $H_z$ of the center of mass in the vertical direction of the biped robot when the step starting phase ends; The movement trajectory of the center of mass of the biped robot in the mid-step phase acquired by the center of mass mid-step phase trajectory acquiring unit satisfies the following condition: the heights of the center of mass in the vertical direction when the mid-step phase starts and when the mid-step phase ends are both Hz.

In an embodiment of the present disclosure, the parameter value acquiring module is further for selecting angle controlling parameters of swingings of shoulder joints of the biped robot: angular displacement, angular speed and angular acceleration;

the constraint condition setting unit is further for, according to angular displacement values, angular speed values and angular acceleration values that a shoulder joint corresponding to the swinging leg is expected to reach at a starting time moment and an terminating time moment of the swinging of a swinging leg of the biped robot in the mid-step phase, setting an angular constraint condition that the shoulder joint corresponding to the swinging leg is required to satisfy;

the center of mass step starting and step ending phase trajectory calculating unit is further for, according to the angular constraint condition and by using polynomial interpolation, calculating expected angular trajectory of the swinging of the shoulder joint in the mid-step phase;

the constraint condition setting unit is further for, by using an angular displacement value, an angular speed value and an angular acceleration value that a shoulder joint corresponding to the swinging leg is expected to reach at a starting time moment of the swinging of a swinging leg of the biped robot in the mid-step phase, setting a first angular constraint condition that the shoulder joint is required to satisfy in the step starting phase, and a second angular constraint condition that the shoulder joint is required to satisfy in the step ending phase;

the center of mass step starting and step ending phase trajectory calculating unit is further for, according to the first angular constraint condition and the second angular constraint condition and by using polynomial interpolation, calculating the expected angular trajectory of the swinging of the shoulder joint in the step starting phase and the expected angular trajectory of the swinging of the shoulder joint in the step ending phase; and the center of mass trajectory controlling unit is further for, when the biped robot is walking, detecting in real time a turning angle of the shoulder joint, and performing self-adaptive tracking controlling on the detected turning angle of the shoulder joint by using the expected angular trajectories of the shoulder joint in each of the phases, to realize a steady walking of the biped robot.

In an embodiment of the present disclosure, when the gait controlling parameters that the center of mass mid-step phase trajectory acquiring unit selects are position and speed, the position parameter and the speed parameter both comprise three direction components of a forward direction, a lateral direction and a vertical direction when the biped robot is walking;

the first constraint condition that the center of mass satisfies when the step starting phase ends comprises: a first forward direction constraint condition, a first lateral direction constraint condition and a first vertical direction constraint condition;

the first forward direction constraint condition comprises: when the step starting phase starts, the value of the position parameter and the value of the speed parameter are both equal to 0; and when the step starting phase ends, the value of the position parameter is equal to a first position parameter forward direction numerical value, and the value of the speed parameter is equal to a first speed parameter forward direction numerical value;

the first lateral direction constraint condition comprises: when the step starting phase starts, the value of the position parameter is equal to a half of a distance between the two feet of the biped robot, and the value of the speed parameter is equal to 0; and when the step starting phase ends, the value of the position parameter is equal to a first position parameter lateral direction numerical value, and the value of the speed parameter is equal to a first speed parameter lateral direction numerical value; and the first vertical direction constraint condition comprises: when the step starting phase starts, the value of the position parameter is equal to the initial height of the center of mass of the biped robot, and the value of the speed parameter is equal to 0; and when the step starting phase ends, the value of the position parameter is equal to the height Hz of the center of mass in the vertical direction when the step starting phase ends, and the value of the speed parameter is equal to 0; and the second constraint condition comprises: a second forward direction constraint condition, a second lateral direction constraint condition and a second vertical direction constraint condition;

the second forward direction constraint condition comprises: when the step ending phase starts, the value of the position parameter is equal to a second position parameter forward direction numerical value, and the value of the speed parameter is equal to a second speed parameter forward direction numerical value; and when the step ending phase ends, the value of the position parameter and the value of the speed parameter are both equal to 0;

the second lateral direction constraint condition comprises: when the step ending phase starts, the value of the position parameter is equal to a second position parameter lateral direction numerical value, and the value of the speed parameter is equal to a second speed parameter lateral direction numerical value; and when the step ending phase ends, the value of the position parameter is equal to a half of a distance between the two feet of the biped robot, and the value of the speed parameter is equal to 0; and the second vertical direction constraint condition comprises: when the step ending phase starts, the value of the position parameter is equal to the height Hz in the vertical direction when the step starting phase ends, and the value of the speed parameter is equal to 0; and when the step ending phase ends, the value of the position parameter is equal to the initial height of the center of mass of the biped robot, and the value of the speed parameter is equal to 0; and when the gait controlling parameters that the center of mass mid-step phase trajectory acquiring unit selects are position, speed and acceleration, the position parameter, the speed parameter and the acceleration parameter all comprises three direction components of a forward direction, a lateral direction and a vertical direction when the biped robot is walking;

the first forward direction constraint condition comprises: when the step starting phase starts, the value of the position parameter, the value of the speed parameter and the value of the acceleration parameter are all equal to 0; and when the step starting phase ends, the value of the position parameter is equal to a first position parameter forward direction numerical value, the value of the speed parameter is equal to a first speed parameter forward direction numerical value, and the value of the acceleration parameter is equal to a first acceleration parameter forward direction numerical value;

the first lateral direction constraint condition comprises: when the step starting phase starts, the value of the position parameter is a half of a distance between the two feet of the biped robot, and the value of the speed parameter and the value of the acceleration parameter are both equal to 0; and when the step starting phase ends, the value of the position parameter is equal to a first position parameter lateral direction numerical value, the value of the speed parameter is equal to a first speed parameter lateral direction numerical value, and the value of the acceleration parameter is equal to a first acceleration parameter lateral direction numerical value; and the first vertical direction constraint condition comprises: when the step starting phase starts, the value of the position parameter is equal to the initial height of the center of mass of the biped robot, and the value of the speed parameter and the value of the acceleration parameter are both equal to 0; and when the step starting phase ends, the value of the position parameter is equal to the height Hz of the center of mass in the vertical direction when the step starting phase ends, and the value of the speed parameter and the value of the acceleration parameter are both equal to 0; and the second forward direction constraint condition comprises: when the step ending phase starts, the value of the position parameter is equal to a second position parameter forward direction numerical value, the value of the speed parameter is equal to a second speed parameter forward direction numerical value, and the value of the acceleration parameter is equal to a second acceleration parameter forward direction numerical value; and when the step ending phase ends, the value of the position parameter, the value of the speed parameter and the value of the acceleration parameter are all equal to 0;

the second lateral direction constraint condition comprises: when the step ending phase starts, the value of the position parameter is equal to a second position parameter lateral direction numerical value, the value of the speed parameter is equal to a second speed parameter lateral direction numerical value, and the value of the acceleration parameter is equal to a second acceleration parameter lateral direction numerical value; and when the step ending phase ends, the value of the position parameter is equal to a half of a distance between the two feet of the biped robot, and the value of the speed parameter and the value of the acceleration parameter are both equal to 0; and the second vertical direction constraint condition comprises: when the step ending phase starts, the value of the position parameter is equal to the height Hz of the center of mass in the vertical direction when the step starting phase ends, and the value of the speed parameter and the value of the acceleration parameter are both equal to 0; and when the step ending phase ends, the value of the position parameter is equal to the initial height of the center of mass of the biped robot, and the value of the speed parameter and the value of the acceleration parameter are both equal to 0.

It should be noted that, the device for controlling a gait of a biped robot of the present embodiment is corresponding to the above method for controlling a gait of a biped robot. Therefore, the working process of the gait controlling device of the present embodiment can be seen in the corresponding descriptions of the above method, and will not be in detail described here.

In conclusion, compared with prior technical solutions, the embodiments of the present disclosure propose a method for controlling the step starting phase and the step ending phase that is more effective, can start and end the normal walking process rapidly in one step, which avoids the problem in the prior art that several phases are required to reach and end the normal walking state. In addition, by reasonably linking with the trajectories in the mid-step phase that are calculated by using the inverted pendulum model in terms of position, speed and acceleration parameters, the step starting phase and the step ending phase are both also ensured to satisfy the stability condition. In addition, in normal mid-step gait, the embodiments of the present disclosure, by designing by the linear inverted pendulum model in the one-leg-supporting period and the two-leg-supporting period, ensure that the robot satisfies the stability condition in the two phases, and reduce the impact on the robot during the switching of the supporting leg.

The above descriptions are just preferred embodiments of the present disclosure, rather than limitations to the protection scope of the present disclosure. Any amendment, equivalent replacement, improvement, etc. made within the spirit and principle of the present disclosure fall within the protection scope of the present disclosure.

What is claimed is:

1. A method for controlling a gait of a biped robot, the method comprising:
   selecting gait controlling parameters of the biped robot in a step starting phase, a mid-step phase and a step ending phase, and acquiring a movement trajectory of a center of mass of the biped robot in the mid-step phase when a zero moment point of the biped robot is located within a steady area;
   obtaining, according to the movement trajectory of the center of mass in the mid-step phase, first numerical values of each of the gait controlling parameters of the center of mass when the mid-step phase starts and second numerical values of each of the gait controlling parameters of the center of mass when the mid-step phase ends;
   setting a first constraint condition that the center of mass is required to satisfy when the step starting phase ends by using the first numerical values, and setting a second constraint condition that the center of mass is required to satisfy when the step ending phase starts by using the second numerical values;
   calculating the movement trajectories of the center of mass in the step starting phase and the step ending phase on the basis of the first constraint condition and the second constraint condition, respectively; and
   controlling walking of the biped robot, so that when the biped robot is walking, the movement trajectory of the center of mass satisfies each of the movement trajectories of the center of mass in the step starting phase, the mid-step phase and the step ending phase, to realize a steady walking of the biped robot.

2. The method according to claim 1, wherein in the controlling of the walking of the biped robot, control is performed so that when the biped robot is walking, the movement trajectory of the center of mass satisfies each of the movement trajectories of the center of mass in the step starting phase, the mid-step phase and the step ending phase, and the controlling comprises:
   calculating, according to the movement trajectories of the center of mass in each of the phases, the movement trajectories of hip joints of the biped robot in the step starting phase, the mid-step phase and the step ending phase;
   calculating, according to an expected movement height of ankle joints of the biped robot, the movement trajectories of the ankle joints of the two legs in the step starting phase, the mid-step phase and the step ending phase;
   by using the movement trajectories of the hip joints and the ankle joints in each of the phases, the structural position relations of the legs of the biped robot and a leg length numerical value, obtaining expected angular trajectories corresponding to the hip joints, the ankle joints and knee joints in each of the phases by calculating;

selecting one or more of the hip joints, the ankle joints and the knee joints as a controlling point(s); and when the biped robot is walking, detecting in real time a turning angle of the controlling point, and performing self-adaptive tracking controlling on the detected turning angle of the controlling point by using the expected angular trajectories of the controlling point in each of the phases, so that when the biped robot is walking, the movement trajectory of the center of mass satisfies each of the movement trajectories of the center of mass in the step starting phase, the mid-step phase and the step ending phase.

3. The method according to claim 1, wherein each parameter of the gait controlling parameters comprises three direction components of a forward direction, a lateral direction and a vertical direction when the biped robot is walking; and wherein, the gait controlling parameters comprise position and speed, or the gait controlling parameters comprise position, speed and acceleration.

4. The method according to claim 3, further comprises:

according to an initial speed of the center of mass when the mid-step phase starts that is expected to reach and a conversion relation between kinetic energy and potential energy, calculating a height Hz of the center of mass in the vertical direction of the biped robot when the step starting phase ends;

wherein the acquired movement trajectory of the center of mass of the biped robot in the mid-step phase satisfies the following condition: the heights of the center of mass in the vertical direction when the mid-step phase starts and when the mid-step phase ends are both Hz.

5. The method according to claim 4, wherein the according to an initial speed of the center of mass when the mid-step phase starts that is expected to reach and a conversion relation between kinetic energy and potential energy, calculating a height Hz of the center of mass in the vertical direction of the biped robot when the step starting phase ends comprises:

calculating a distance $\Delta z$ by which the center of mass has dropped when the step starting phase ends by the following formula:

$$mg\Delta z = \frac{1}{2}m(v_1^2 - v_0^2);$$

wherein, $v_1$ is the initial speed of the center of mass when the mid-step phase starts that is expected to reach, $v_0$ is the speed at an initial time moment in the step starting phase, m is a mass of the biped robot, and g is gravitational acceleration; and obtaining the height Hz of the center of mass in the vertical direction when the step starting phase ends from the difference value between the initial height of the center of mass in the vertical direction and the $\Delta z$.

6. The method according to claim 4, wherein:

when the gait controlling parameters are position and speed, the position parameter and the speed parameter both comprise three direction components of a forward direction, a lateral direction and a vertical direction when the biped robot is walking;

the first constraint condition that the center of mass satisfies when the step starting phase ends comprises: a first forward direction constraint condition, a first lateral direction constraint condition and a first vertical direction constraint condition;

the first forward direction constraint condition comprises: when the step starting phase starts, the value of the position parameter and the value of the speed parameter are both equal to 0; and when the step starting phase ends, the value of the position parameter is equal to a first position parameter forward direction numerical value, and the value of the speed parameter is equal to a first speed parameter forward direction numerical value;

the first lateral direction constraint condition comprises: when the step starting phase starts, the value of the position parameter is equal to a half of a distance between the two feet of the biped robot, and the value of the speed parameter is equal to 0; and when the step starting phase ends, the value of the position parameter is equal to a first position parameter lateral direction numerical value, and the value of the speed parameter is equal to a first speed parameter lateral direction numerical value;

the first vertical direction constraint condition comprises: when the step starting phase starts, the value of the position parameter is equal to the initial height of the center of mass of the biped robot, and the value of the speed parameter is equal to 0; and when the step starting phase ends, the value of the position parameter is equal to the height Hz of the center of mass in the vertical direction when the step starting phase ends, and the value of the speed parameter is equal to 0;

the second constraint condition comprises: a second forward direction constraint condition, a second lateral direction constraint condition and a second vertical direction constraint condition;

the second forward direction constraint condition comprises: when the step ending phase starts, the value of the position parameter is equal to a second position parameter forward direction numerical value, and the value of the speed parameter is equal to a second speed parameter forward direction numerical value; and when the step ending phase ends, the value of the position parameter and the value of the speed parameter are both equal to 0;

the second lateral direction constraint condition comprises: when the step ending phase starts, the value of the position parameter is equal to a second position parameter lateral direction numerical value, and the value of the speed parameter is equal to a second speed parameter lateral direction numerical value; and when the step ending phase ends, the value of the position parameter is equal to a half of a distance between the two feet of the biped robot, and the value of the speed parameter is equal to 0;

the second vertical direction constraint condition comprises: when the step ending phase starts, the value of the position parameter is equal to the height Hz in the vertical direction when the step starting phase ends, and the value of the speed parameter is equal to 0; and when the step ending phase ends, the value of the position parameter is equal to the initial height of the center of mass of the biped robot, and the value of the speed parameter is equal to 0;

when the gait controlling parameters comprise position, speed and acceleration, the position parameter, the speed parameter and the acceleration parameter all comprises three direction components of a forward direction, a lateral direction and a vertical direction when the biped robot is walking;

the first forward direction constraint condition comprises: when the step starting phase starts, the value of the position parameter, the value of the speed parameter and the value of the acceleration parameter are all equal to 0; and when the step starting phase ends, the value of the position parameter is equal to a first position parameter forward direction numerical value, the value of the speed parameter is equal to a first speed parameter forward direction numerical value, and the value of the acceleration parameter s equal to a first acceleration parameter forward direction numerical value;

the first lateral direction constraint condition comprises: when the step starting phase starts, the value of the position parameter is a half of a distance between the two feet of the biped robot, and the value of the speed parameter and the value of the acceleration parameter are both equal to 0; and when the step starting phase ends, the value of the position parameter is equal to a first position parameter lateral direction numerical value, the value of the speed parameter is equal to a first speed parameter lateral direction numerical value, and the value of the acceleration parameter is equal to a first acceleration parameter lateral direction numerical value;

the first vertical direction constraint condition comprises: when the step starting phase starts, the value of the position parameter is equal to the initial height of the center of mass of the biped robot, and the value of the speed parameter and the value of the acceleration parameter are both equal to 0; and when the step starting phase ends, the value of the position parameter is equal to the height Hz of the center of mass in the vertical direction when the step starting phase ends, and the value of the speed parameter and the value of the acceleration parameter are both equal to 0;

the second forward direction constraint condition comprises: when the step ending phase starts, the value of the position parameter is equal to a second position parameter forward direction numerical value, the value of the speed parameter is equal to a second speed parameter forward direction numerical value, and the value of the acceleration parameter is equal to a second acceleration parameter forward direction numerical value; and when the step ending phase ends, the value of the position parameter, the value of the speed parameter and the value of the acceleration parameter are all equal to 0;

the second lateral direction constraint condition comprises: when the step ending phase starts, the value of the position parameter is equal to a second position parameter lateral direction numerical value, the value of the speed parameter is equal to a second speed parameter lateral direction numerical value, and the value of the acceleration parameter is equal to a second acceleration parameter lateral direction numerical value; and when the step ending phase ends, the value of the position parameter is equal to a half of a distance between the two feet of the biped robot, and the value of the speed parameter and the value of the acceleration parameter are both equal to 0; and the second vertical direction constraint condition comprises: when the step ending phase starts, the value of the position parameter is equal to the height Hz of the center of mass in the vertical direction when the step starting phase ends, and the value of the speed parameter and the value of the acceleration parameter are both equal to 0; and when the step ending phase ends, the value of the position parameter is equal to the initial height of the center of mass of the biped robot, and the value of the speed parameter and the value of the acceleration parameter are both equal to 0.

7. The method according to claim 1, wherein the calculating the movement trajectories of the center of mass in the step starting phase and the step ending phase on the basis of the first constraint condition and the second constraint condition, respectively comprises: according to the first constraint condition that the center of mass satisfies when the step starting phase ends, calculating the movement trajectory of the center of mass in the step starting phase by using polynomial interpolation; and according to the second constraint condition that the center of mass satisfies when the step ending phase starts, calculating the movement trajectory of the center of mass in the step ending phase by using polynomial interpolation.

8. The method according to claim 2, wherein the method further comprises:

selecting angle controlling parameters of swingings of shoulder joints of the biped robot: angular displacement, angular speed, and angular acceleration;

according to angular displacement values, angular speed values, and angular acceleration values that a shoulder joint corresponding to the swinging leg is expected to reach at a starting time moment and a terminating time moment of the swinging of a swinging leg of the biped robot in the mid-step phase respectively, setting an angular constraint condition that the shoulder joint corresponding to the swinging leg is required to satisfy;

according to the angular constraint condition and by using polynomial interpolation, calculating expected angular trajectory of the swinging of the shoulder joint in the mid-step phase;

by using an angular displacement value, an angular speed value and an angular acceleration value that a shoulder joint corresponding to the swinging leg is expected to reach at a starting time moment of the swinging of a swinging leg of the biped robot in the mid-step phase, setting a first angular constraint condition that the shoulder joint is required to satisfy in the step starting phase, and a second angular constraint condition that the shoulder joint is required to satisfy in the step ending phase;

according to the first angular constraint condition and the second angular constraint condition and by using polynomial interpolation, calculating the expected angular trajectory of the swinging of the shoulder joint in the step starting phase and the expected angular trajectory of the swinging of the shoulder joint in the step ending phase; and when the biped robot is walking, detecting in real time a turning angle of the shoulder joint, and performing self-adaptive tracking controlling on the detected turning angle of the shoulder joint by using the expected angular trajectories of the shoulder joint in each of the phases, to realize a steady walking of the biped robot.

9. The method according to claim 2, wherein the performing self-adaptive tracking controlling on the detected turning angle of the controlling point by using the expected angular trajectories of the controlling point in each of the phases comprises: obtaining a difference value between the turning angle of each controlling point that is actually detected when the robot is walking and an expected angle corresponding to the joint, inputting the difference value into a proportion integration differentiation angle controller or a proportion differentiation angle controller to perform self-adaptive tracking controlling, and obtaining an input torque of each of the joints, to drive the movements of each of the joints of the robot by using the input torque.

10. A device for controlling a gait of a biped robot, comprising:
a center of mass mid-step phase trajectory acquiring unit, for selecting gait controlling parameters of the biped robot in a step starting phase, a mid-step phase and a step ending phase, and acquiring a movement trajectory of a center of mass of the biped robot in the mid-step phase when a zero moment point of the biped robot is located within a steady area;
a parameter value acquiring unit, for obtaining, according to the movement trajectory of the center of mass in the mid-step phase, first numerical values of each of the gait controlling parameters of the center of mass when the mid-step phase starts and second numerical values of each of the gait controlling parameters of the center of mass when the mid-step phase ends;
a constraint condition setting unit, for setting a first constraint condition that the center of mass is required to satisfy when the step starting phase ends by using the first numerical values, and setting a second constraint condition that the center of mass is required to satisfy when the step ending phase starts by using the second numerical values;
a center of mass step starting and step ending phase trajectory calculating unit, for calculating the movement trajectories of the center of mass in the step starting phase and the step ending phase on the basis of the first constraint condition and the second constraint condition, respectively; and
a center of mass trajectory controlling unit, for controlling a walking of the biped robot, so that when the biped robot is walking, the movement trajectory of the center of mass satisfies each of the movement trajectories of the center of mass in the step starting phase, the mid-step phase and the step ending phase, to realize a steady walking of the biped robot.

11. The device according to claim 10, wherein the center of mass trajectory controlling unit comprises: an ankle joint trajectory calculating module, a hip joint trajectory calculating module, a joint angle calculating module and a joint angle controlling module;
the ankle joint trajectory calculating module is for calculating, according to an expected movement height of ankle joints of the biped robot, the movement trajectories of the ankle joints of the two legs in the step starting phase, the mid-step phase and the step ending phase;
the hip joint trajectory calculating module is for calculating, according to the movement trajectories of the center of mass in each of the phase, the movement trajectories of hip joints of the biped robot in the step starting phase, the mid-step phase and the step ending phase;
the joint angle calculating module is for, by using the movement trajectories of the hip joints and the ankle joints in each of the phases, the structural position relations of the legs of the biped robot and a leg length numerical value, obtaining expected angular trajectories of the hip joints, the ankle joints and knee joints in each of the phases by calculating; and the joint angle controlling module is for selecting one or more of the hip joints, the ankle joints and the knee joints as a controlling point(s); and when the biped robot is walking, detecting in real time a turning angle of the controlling point, and performing self-adaptive tracking controlling on the detected turning angle of the controlling point by using the expected angular trajectories of the controlling point in each of the phases, so that when the biped robot is walking, the movement trajectory of the center of mass satisfies each of the movement trajectories of the center of mass in the step starting phase, the mid-step phase and the step ending phase.

12. The device according to claim 10, wherein the center of mass mid-step phase trajectory acquiring unit is for that each parameter of the acquired gait controlling parameters comprises three direction components of a forward direction, a lateral direction and a vertical direction when the biped robot is walking;
wherein, the gait controlling parameters comprise position and speed, or the gait controlling parameters comprise position, speed and acceleration.

13. The device according to claim 12, wherein the center of mass step starting and step ending phase trajectory calculating unit is further for, according to an initial speed of the center of mass when the mid-step phase starts that is expected to reach and a conversion relation between kinetic energy and potential energy, calculating a height Hz of the center of mass in the vertical direction of the biped robot when the step starting phase ends; and the movement trajectory of the center of mass of the biped robot in the mid-step phase acquired by the center of mass mid-step phase trajectory acquiring unit satisfies the following condition: the heights of the center of mass in the vertical direction when the mid-step phase starts and when the mid-step phase ends are both Hz.

14. The device according to claim 11, wherein the parameter value acquiring module is further for selecting angle controlling parameters of swingings of shoulder joints of the biped robot: angular displacement, angular speed and angular acceleration;
the constraint condition setting unit is further for, according to angular displacement values, angular speed values and angular acceleration values that a shoulder joint corresponding to the swinging leg is expected to reach at a starting time moment and a terminating time moment of the swinging of a swinging leg of the biped robot in the mid-step phase, setting an angular constraint condition that the shoulder joint corresponding to the swinging leg is required to satisfy;
the center of mass step starting and step ending phase trajectory calculating unit is further for, according to the angular constraint condition and by using polynomial interpolation, calculating expected angular trajectory of the swinging of the shoulder joint in the mid-step phase;
the constraint condition setting unit is further for, by using an angular displacement value, an angular speed value and an angular acceleration value that a shoulder joint corresponding to the swinging leg is expected to reach at a starting time moment of the swinging of a swinging leg of the biped robot in the mid-step phase, setting a first angular constraint condition that the shoulder joint is required to satisfy in the step starting phase, and a second angular constraint condition that the shoulder joint is required to satisfy in the step ending phase;

the center of mass step starting and step ending phase trajectory calculating unit is further for, according to the first angular constraint condition and the second angular constraint condition and by using polynomial interpolation, calculating the expected angular trajectory of the swinging of the shoulder joint in the step starting phase and the expected angular trajectory of the swinging of the shoulder joint in the step ending phase; and the center of mass trajectory controlling unit is further for, when the biped robot is walking, detecting in real time a turning angle of the shoulder joint, and performing self-adaptive tracking controlling on the detected turning angle of the shoulder joint by using the expected angular trajectories of the shoulder joint in each of the phases, to realize a steady walking of the biped robot.

15. The device according to claim 14, wherein when the gait controlling parameters that the center of mass mid-step phase trajectory acquiring unit selects are position and speed, the position parameter and the speed parameter both comprise three direction components of a forward direction, a lateral direction and a vertical direction when the biped robot is walking;

the first constraint condition that the center of mass satisfies when the step starting phase ends comprises: a first forward direction constraint condition, a first lateral direction constraint condition and a first vertical direction constraint condition;

the first forward direction constraint condition comprises: when the step starting phase starts, the value of the position parameter and the value of the speed parameter are both equal to 0, and when the step starting phase ends, the value of the position parameter is equal to a first position parameter forward direction numerical value, and the value of the speed parameter is equal to a first speed parameter forward direction numerical value;

the first lateral direction constraint condition comprises: when the step starting phase starts, the value of the position parameter is equal to a half of a distance between the two feet of the biped robot, and the value of the speed parameter is equal to 0, and when the step starting phase ends, the value of the position parameter is equal to a first position parameter lateral direction numerical value, and the value of the speed parameter is equal to a first speed parameter lateral direction numerical value;

the first vertical direction constraint condition comprises: when the step starting phase starts, the value of the position parameter is equal to the initial height of the center of mass of the biped robot, and the value of the speed parameter is equal to 0, and when the step starting phase ends, the value of the position parameter is equal to the height $H_z$ of the center of mass in the vertical direction when the step starting phase ends, and the value of the speed parameter is equal to 0;

the second constraint condition comprises: a second forward direction constraint condition, a second lateral direction constraint condition and a second vertical direction constraint condition;

the second forward direction constraint condition comprises: when the step ending phase starts, the value of the position parameter is equal to a second position parameter forward direction numerical value, and the value of the speed parameter is equal to a second speed parameter forward direction numerical value; and when the step ending phase ends, the value of the position parameter and the value of the speed parameter are both equal to 0;

the second lateral direction constraint condition comprises: when the step ending phase starts, the value of the position parameter is equal to a second position parameter lateral direction numerical value, and the value of the speed parameter is equal to a second speed parameter lateral direction numerical value, and when the step ending phase ends, the value of the position parameter is equal to a half of a distance between the two feet of the biped robot, and the value of the speed parameter is equal to 0;

the second vertical direction constraint condition comprises: when the step ending phase starts, the value of the position parameter is equal to the height $H_z$ in the vertical direction when the step starting phase ends, and the value of the speed parameter is equal to 0, and when the step ending phase ends, the value of the position parameter is equal to the initial height of the center of mass of the biped robot, and the value of the speed parameter is equal to 0, and when the gait controlling parameters that the center of mass mid-step phase trajectory acquiring unit selects are position, speed and acceleration, the position parameter, the speed parameter and the acceleration parameter all comprises three direction components of a forward direction, a lateral direction and a vertical direction when the biped robot is walking;

the first forward direction constraint condition comprises: when the step starting phase starts, the value of the position parameter, the value of the speed parameter and the value of the acceleration parameter are all equal to 0, and when the step starting phase ends, the value of the position parameter is equal to a first position parameter forward direction numerical value, the value of the speed parameter is equal to a first speed parameter forward direction numerical value, and the value of the acceleration parameter is equal to a first acceleration parameter forward direction numerical value;

the first lateral direction constraint condition comprises: when the step starting phase starts, the value of the position parameter is a half of a distance between the two feet of the biped robot, and the value of the speed parameter and the value of the acceleration parameter are both equal to 0, and when the step starting phase ends, the value of the position parameter is equal to a first position parameter lateral direction numerical value, the value of the speed parameter is equal to a first speed parameter lateral direction numerical value, and the value of the acceleration parameter is equal to a first acceleration parameter lateral direction numerical value;

the first vertical direction constraint condition comprises: when the step starting phase starts, the value of the position parameter is equal to the initial height of the center of mass of the biped robot, and the value of the speed parameter and the value of the acceleration parameter are both equal to 0, and when the step starting phase ends, the value of the position parameter is equal to the height $H_z$ of the center of mass in the vertical direction when the step starting phase ends, and the value of the speed parameter and the value of the acceleration parameter are both equal to 0;

the second forward direction constraint condition comprises: when the step ending phase starts, the value of the position parameter is equal to a second position parameter forward direction numerical value, the value of the speed parameter is equal to a second speed parameter forward direction numerical value, and the value of the acceleration parameter is equal to a second acceleration parameter forward direction numerical value, and when the step ending phase ends, the value of the position parameter, the value of the speed parameter and the value of the acceleration parameter are all equal to 0;

the second lateral direction constraint condition comprises: when the step ending phase starts, the value of the position parameter is equal to a second position parameter lateral direction numerical value, the value of the speed parameter is equal to a second speed parameter lateral direction numerical value, and the value of the acceleration parameter is equal to a second acceleration parameter lateral direction numerical value, and when the step ending phase ends, the value of the position parameter is equal to a half of a distance between the two feet of the biped robot, and the value of the speed parameter and the value of the acceleration parameter are both equal to 0; and the second vertical direction constraint condition comprises: when the step ending phase starts, the value of the position parameter is equal to the height Hz of the center of mass in the vertical direction when the step starting phase ends, and the value of the speed parameter and the value of the acceleration parameter are both equal to 0, and when the step ending phase ends, the value of the position parameter is equal to the initial height of the center of mass of the biped robot, and the value of the speed parameter and the value of the acceleration parameter are both equal to 0.

16. A device for controlling a gait of a biped robot, wherein the device comprises a processor and at least one computer-readable storage medium, the at least one computer-readable storage medium stores computer-executable instructions which, when executed by the processor, cause the processor to perform operations comprising:

selecting gait controlling parameters of the biped robot in a step starting phase, a mid-step phase and a step ending phase, and acquiring a movement trajectory of a center of mass of the biped robot in the mid-step phase when a zero moment point of the biped robot is located within a steady area;

according to the movement trajectory of the center of mass in the mid-step phase, first numerical values of each of the gait controlling parameters of the center of mass when the mid-step phase starts and second numerical values of each of the gait controlling parameters of the center of mass when the mid-step phase ends;

setting a first constraint condition that the center of mass is required to satisfy when the step starting phase ends by using the first numerical values, and setting a second constraint condition that the center of mass is required to satisfy when the step ending phase starts by using the second numerical values;

calculating the movement trajectories of the center of mass in the step starting phase and the step ending phase on the basis of the first constraint condition and the second constraint condition, respectively; and controlling a walking of the biped robot, so that when the biped robot is walking, the movement trajectory of the center of mass satisfies each of the movement trajectories of the center of mass in the step starting phase, the mid-step phase and the step ending phase, to realize a steady walking of the biped robot.

17. The device according to claim 16, wherein the controlling the walking of the biped robot, so that when the biped robot is walking, the movement trajectory of the center of mass satisfies each of the movement trajectories of the center of mass in the step starting phase, the mid-step phase and the step ending phase comprises:

calculating, according to an expected movement height of ankle joints of the biped robot, the movement trajectories of the ankle joints of the two legs in the step starting phase, the mid-step phase and the step ending phase;

calculating, according to the movement trajectories of the center of mass in each of the phase, the movement trajectories of hip joints of the biped robot in the step starting phase, the mid-step phase and the step ending phase;

by using the movement trajectories of the hip joints and the ankle joints in each of the phases, the structural position relations of the legs of the biped robot and a leg length numerical value, obtaining expected angular trajectories of the hip joints, the ankle joints and knee joints in each of the phases by calculating;

selecting one or more of the hip joints, the ankle joints and the knee joints as a controlling point(s); and when the biped robot is walking, detecting in real time a turning angle of the controlling point, and performing self-adaptive tracking controlling on the detected turning angle of the controlling point by using the expected angular trajectories of the controlling point in each of the phases, so that when the biped robot is walking, the movement trajectory of the center of mass satisfies each of the movement trajectories of the center of mass in the step starting phase, the mid-step phase and the step ending phase.

18. The device according to claim 16, wherein each parameter of the acquired gait controlling parameters comprises three direction components of a forward direction, a lateral direction and a vertical direction when the biped robot is walking; wherein, the gait controlling parameters comprise position and speed, or the gait controlling parameters comprise position, speed and acceleration.

19. The device according to claim 18, wherein the processor performs further operations including:

according to an initial speed of the center of mass when the mid-step phase starts that is expected to reach and a conversion relation between kinetic energy and potential energy, calculating a height Hz of the center of mass in the vertical direction of the biped robot when the step starting phase ends; and the movement trajectory of the center of mass of the biped robot in the mid-step phase acquired by the center of mass mid-step phase trajectory acquiring unit satisfies the following condition: the heights of the center of mass in the vertical direction when the mid-step phase starts and when the mid-step phase ends are both Hz.

20. The device according to claim 17, wherein the processor performs further operations including:

selecting angle controlling parameters of swingings of shoulder joints of the biped robot: angular displacement, angular speed and angular acceleration;

according to angular displacement values, angular speed values and angular acceleration values that a shoulder joint corresponding to the swinging leg is expected to reach at a starting time moment and a terminating time moment of the swinging of a swinging leg of the biped robot in the mid-step phase, setting an angular constraint condition that the shoulder joint corresponding to the swinging leg is required to satisfy;

according to the angular constraint condition and by using polynomial interpolation, calculating expected angular trajectory of the swinging of the shoulder joint in the mid-step phase;

by using an angular displacement value, an angular speed value and an angular acceleration value that a shoulder joint corresponding to the swinging leg is expected to reach at a starting time moment of the swinging of a swinging leg of the biped robot in the mid-step phase, setting a first angular constraint condition that the shoulder joint is required to satisfy in the step starting phase, and a second angular constraint condition that the shoulder joint is required to satisfy in the step ending phase;

according to the first angular constraint condition and the second angular constraint condition and by using polynomial interpolation, calculating the expected angular trajectory of the swinging of the shoulder joint in the step starting phase and the expected angular trajectory of the swinging of the shoulder joint in the step ending phase; and when the biped robot is walking, detecting in real time a turning angle of the shoulder joint, and performing self-adaptive tracking controlling on the detected turning angle of the shoulder joint by using the expected angular trajectories of the shoulder joint in each of the phases, to realize a steady walking of the biped robot.

21. The device according to claim 20, wherein the processor performs further operations including:

when the gait controlling parameters are position and speed, the position parameter and the speed parameter both comprise three direction components of a forward direction, a lateral direction and a vertical direction when the biped robot is walking;

the first constraint condition that the center of mass satisfies when the step starting phase ends comprises: a first forward direction constraint condition, a first lateral direction constraint condition and a first vertical direction constraint condition;

the first forward direction constraint condition comprises: when the step starting phase starts, the value of the position parameter and the value of the speed parameter are both equal to 0, and when the step starting phase ends, the value of the position parameter is equal to a first position parameter forward direction numerical value, and the value of the speed parameter is equal to a first speed parameter forward direction numerical value;

the first lateral direction constraint condition comprises: when the step starting phase starts, the value of the position parameter is equal to half of a distance between the two feet of the biped robot, and the value of the speed parameter is equal to 0, and when the step starting phase ends, the value of the position parameter is equal to a first position parameter lateral direction numerical value, and the value of the speed parameter is equal to a first speed parameter lateral direction numerical value;

the first vertical direction constraint condition comprises: when the step starting phase starts, the value of the position parameter is equal to the initial height of the center of mass of the biped robot, and the value of the speed parameter is equal to 0, and when the step starting phase ends, the value of the position parameter is equal to the height $Hz$ of the center of mass in the vertical direction when the step starting phase ends, and the value of the speed parameter is equal to 0;

the second constraint condition comprises: a second forward direction constraint condition, a second lateral direction constraint condition and a second vertical direction constraint condition;

the second forward direction constraint condition comprises: when the step ending phase starts, the value of the position parameter is equal to a second position parameter forward direction numerical value, and the value of the speed parameter is equal to a second speed parameter forward direction numerical value; and when the step ending phase ends, the value of the position parameter and the value of the speed parameter are both equal to 0;

the second lateral direction constraint condition comprises: when the step ending phase starts, the value of the position parameter is equal to a second position parameter lateral direction numerical value, and the value of the speed parameter is equal to a second speed parameter lateral direction numerical value; and when the step ending phase ends, the value of the position parameter is equal to a half of a distance between the two feet of the biped robot, and the value of the speed parameter is equal to 0; and the second vertical direction constraint condition comprises: when the step ending phase starts, the value of the position parameter is equal to the height $Hz$ in the vertical direction when the step starting phase ends, and the value of the speed parameter is equal to 0, and when the step ending phase ends, the value of the position parameter is equal to the initial height of the center of mass of the biped robot, and the value of the speed parameter is equal to 0, and when the gait controlling parameters are position, speed and acceleration, the position parameter, the speed parameter and the acceleration parameter all comprises three direction components of a forward direction, a lateral direction and a vertical direction when the biped robot is walking;

the first forward direction constraint condition comprises: when the step starting phase starts, the value of the position parameter, the value of the speed parameter and the value of the acceleration parameter are all equal to 0, and when the step starting phase ends, the value of the position parameter is equal to a first position parameter forward direction numerical value, the value of the speed parameter is equal to a first speed parameter forward direction numerical value, and the value of the acceleration parameter is equal to a first acceleration parameter forward direction numerical value;

the first lateral direction constraint condition comprises: when the step starting phase starts, the value of the position parameter is half of a distance between the two feet of the biped robot, and the value of the speed parameter and the value of the acceleration parameter are both equal to 0, and when the step starting phase ends, the value of the position parameter is equal to a first position parameter lateral direction numerical value, the value of the speed parameter is equal to a first speed parameter lateral direction numerical value, and the value of the acceleration parameter is equal to a first acceleration parameter lateral direction numerical value;

the first vertical direction constraint condition comprises: when the step starting phase starts, the value of the position parameter is equal to the initial height of the center of mass of the biped robot, and the value of the speed parameter and the value of the acceleration parameter are both equal to 0, and when the step starting phase ends, the value of the position parameter is equal to the height Hz of the center of mass in the vertical direction when the step starting phase ends, and the value of the speed parameter and the value of the acceleration parameter are both equal to 0;

the second forward direction constraint condition comprises: when the step ending phase starts, the value of the position parameter is equal to a second position parameter forward direction numerical value, the value of the speed parameter is equal to a second speed parameter forward direction numerical value, and the value of the acceleration parameter is equal to a second acceleration parameter forward direction numerical value, and when the step ending phase ends, the value of the position parameter, the value of the speed parameter and the value of the acceleration parameter are all equal to 0;

the second lateral direction constraint condition comprises: when the step ending phase starts, the value of the position parameter is equal to a second position parameter lateral direction numerical value, the value of the speed parameter is equal to a second speed parameter lateral direction numerical value, and the value of the acceleration parameter is equal to a second acceleration parameter lateral direction numerical value, and when the step ending phase ends, the value of the position parameter is equal to half of a distance between the two feet of the biped robot, and the value of the speed parameter and the value of the acceleration parameter are both equal to 0; and the second vertical direction constraint condition comprises: when the step ending phase starts, the value of the position parameter is equal to the height Hz of the center of mass in the vertical direction when the step starting phase ends, and the value of the speed parameter and the value of the acceleration parameter are both equal to 0, and when the step ending phase ends, the value of the position parameter is equal to the initial height of the center of mass of the biped robot, and the value of the speed parameter and the value of the acceleration parameter are both equal to 0.

* * * * *